(12) United States Patent
Amante et al.

(10) Patent No.: US 12,176,506 B2
(45) Date of Patent: Dec. 24, 2024

(54) BATTERY COLD PLATE AND CHASSIS WITH INTERLOCKING JOINTS

(71) Applicant: Bell Textron Inc., Fort Worth, TX (US)

(72) Inventors: William A. Amante, Grapevine, TX (US); Jeffrey B. Cloud, Mansfield, TX (US)

(73) Assignee: Textron Innovations Inc., Providence, RI (US)

(*) Notice: Subject to any disclaimer, the term of this patent is extended or adjusted under 35 U.S.C. 154(b) by 194 days.

(21) Appl. No.: 17/172,373

(22) Filed: Feb. 10, 2021

(65) Prior Publication Data
US 2022/0255160 A1 Aug. 11, 2022

(51) Int. Cl.
| | |
|---|---|
| H01M 10/6554 | (2014.01) |
| F28D 1/03 | (2006.01) |
| F28F 3/12 | (2006.01) |
| H01M 10/613 | (2014.01) |
| H01M 10/625 | (2014.01) |
| H01M 10/6556 | (2014.01) |
| F28D 21/00 | (2006.01) |

(52) U.S. Cl.
CPC .......... *H01M 10/6554* (2015.04); *F28D 1/03* (2013.01); *F28F 3/12* (2013.01); *H01M 10/613* (2015.04); *H01M 10/625* (2015.04); *H01M 10/6556* (2015.04); *F28D 2021/0019* (2013.01); *F28D 2021/0029* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 8,703,319 B1 | 4/2014 | Aston | |
| 8,920,594 B2 | 12/2014 | Carstensen | |
| 11,267,327 B2 | 3/2022 | Matecki | |
| 11,728,540 B2 | 8/2023 | Amante | |
| 2002/0162696 A1 | 11/2002 | Maus | |
| 2005/0180104 A1* | 8/2005 | Olesen | H01L 23/473 361/689 |
| 2006/0071124 A1 | 4/2006 | Young | |
| 2006/0105236 A1* | 5/2006 | Zhu | H01M 50/186 429/185 |

(Continued)

FOREIGN PATENT DOCUMENTS

| | | |
|---|---|---|
| CN | 102931364 | 2/2013 |
| DE | 102014200989 | 7/2015 |

(Continued)

*Primary Examiner* — Ula C Ruddock
*Assistant Examiner* — Mary Grace Byram
(74) *Attorney, Agent, or Firm* — Frost Brown Todd LLP

(57) ABSTRACT

A cold plate is couplable with a component for dissipating heat from a component. The cold plate includes a top plate coupled with a bottom plate to receive a cooling medium therebetween. The top plate includes a body and a plurality of walls extending from the body, wherein each wall of the plurality of walls includes a recess extending within the wall. The bottom plate includes a body and a plurality of walls extending from the body such that an end portion of each wall of the bottom plate is inserted within the recess of each wall of the top plate to form an interlocking joint.

20 Claims, 18 Drawing Sheets

(56) References Cited

U.S. PATENT DOCUMENTS

| | | | | |
|---|---|---|---|---|
| 2006/0237166 A1* | 10/2006 | Otey | | F28F 3/02 165/170 |
| 2010/0243346 A1* | 9/2010 | Anderson | | H01M 10/625 180/65.21 |
| 2011/0189525 A1* | 8/2011 | Palanchon | | H01M 10/659 165/81 |
| 2011/0206966 A1* | 8/2011 | Schmid | | F28F 3/02 429/120 |
| 2011/0287287 A1* | 11/2011 | Kang | | H01M 10/643 429/82 |
| 2012/0028099 A1* | 2/2012 | Aoki | | H01M 10/625 429/120 |
| 2012/0121946 A1 | 5/2012 | Eckstein | | |
| 2012/0156543 A1 | 6/2012 | Cicero | | |
| 2013/0244077 A1* | 9/2013 | Palanchon | | F28F 3/12 429/120 |
| 2014/0305622 A1* | 10/2014 | Daubitzer | | H01M 10/613 165/169 |
| 2015/0266387 A1 | 9/2015 | Garfinkel | | |
| 2017/0018811 A1* | 1/2017 | Bradwell | | H01M 50/463 |
| 2017/0047624 A1 | 2/2017 | Gunna | | |
| 2018/0212222 A1 | 7/2018 | Barton | | |
| 2018/0304390 A1 | 10/2018 | Hirayama | | |
| 2019/0237827 A1 | 8/2019 | Ge | | |
| 2019/0252744 A1* | 8/2019 | Zimmermann | | H01M 50/204 |
| 2019/0296300 A1 | 9/2019 | Zimmermann | | |
| 2019/0319249 A1 | 10/2019 | Barton et al. | | |
| 2019/0393671 A1 | 12/2019 | Mochalov | | |
| 2020/0006824 A1 | 1/2020 | Lim | | |
| 2020/0006825 A1 | 1/2020 | Lee | | |
| 2020/0277061 A1 | 9/2020 | Becker | | |
| 2020/0313260 A1 | 10/2020 | Wang | | |
| 2022/0077520 A1 | 3/2022 | Donovan | | |

FOREIGN PATENT DOCUMENTS

| | | |
|---|---|---|
| DE | 102014203644 | 9/2015 |
| DE | 102015107170 | 11/2016 |
| DE | 102018202120 | 8/2019 |

* cited by examiner

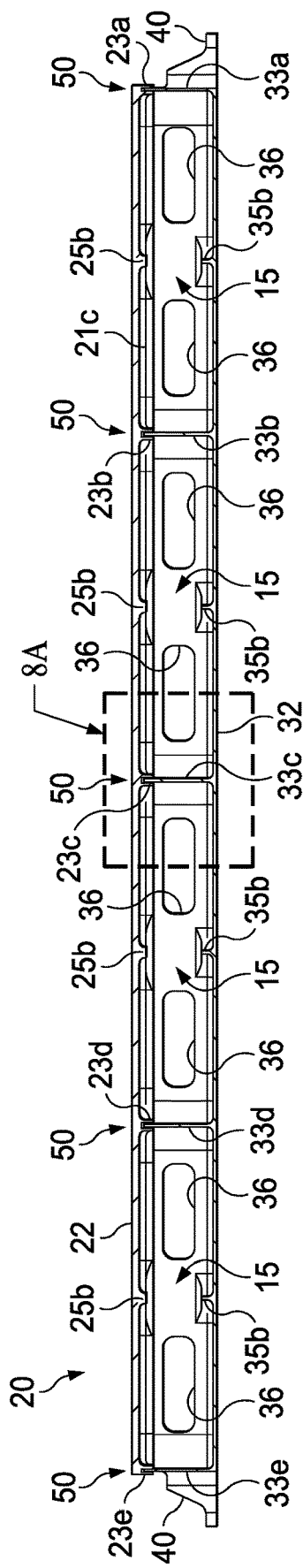
FIG. 8
FIG. 8A
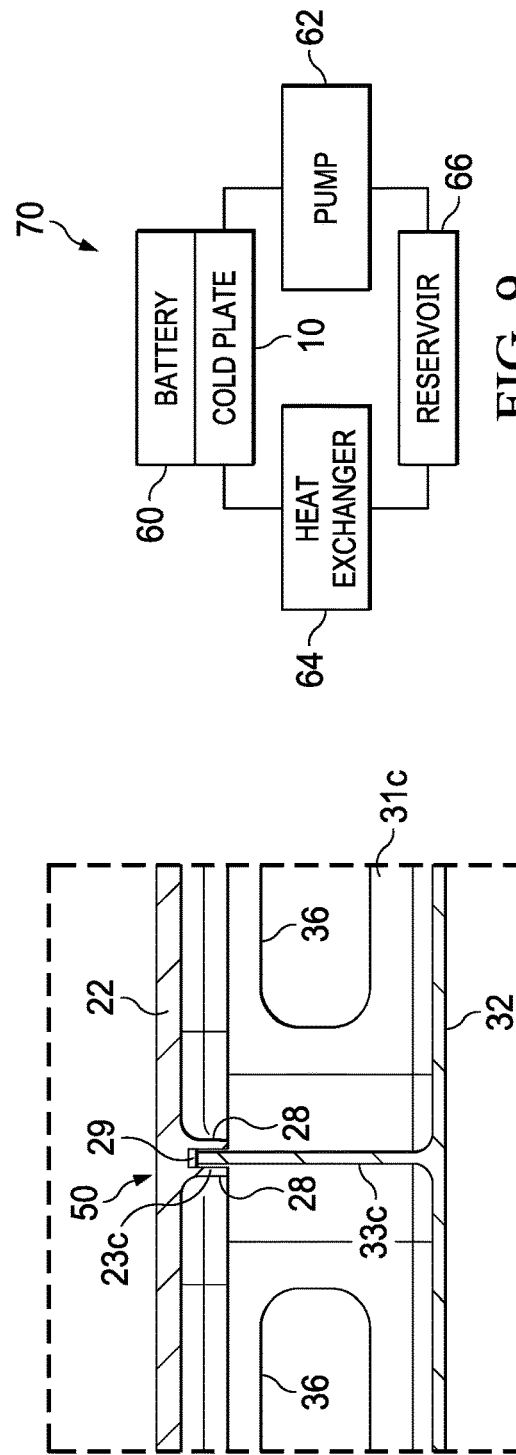
FIG. 9

BATTERY COLD PLATE AND CHASSIS WITH INTERLOCKING JOINTS

TECHNICAL FIELD

The present disclosure is directed to in general to the field of cold plates and, more particularly, though not exclusively, to a cold plate for providing localized cooling of a component that generates heat and for supporting the weight of the component.

BACKGROUND OF THE INVENTION

In general, cold plates provide localized cooling for a component that generates heat, such as batteries or other electrical components, by transferring heat from the component to a cooling medium within the cold plate. In some versions, cold plates further use a series of thermally conductive metallic tubes, an open manifold, and/or internal cooling fins as a heat sink to aid in dissipating the heat. Cold plates typically include two thermally conductive metallic plates joined together in parallel to allow a coolant, such as air and/or liquid, to flow between them as the cooling medium. Many ways have been developed to join these two plates together such as brazing, soldering, friction stir-welding, etc. Such joints may be insufficient for providing a fluid-tight bond between the plates to avoid loss of coolant in a vibratory environment, such as during operation of an aircraft. The structure of such cold plates may also be inadequate for supporting the cooled component such that additional parts may be needed to support the cooled component, which may thereby add weight to an aircraft.

BRIEF SUMMARY OF THE INVENTION

In some versions, it may be desirable to provide a cooling plate to provide localized cooling to a component that generates heat as well as to support the weight of such component. For instance, in an aircraft, such a cold plate can reduce the number of parts needed to provide cooling to conserve space and weight in the aircraft. It may also be desirable to provide a cold plate that is sufficiently robust to withstand a vibratory environment, such as on an aircraft, to inhibit a cooling medium with the cold plate to leak from the cold plate to surrounding components. Accordingly, a cold plate is described herein that is configured to provide both cooling and support for a component that is sufficiently robust to inhibit a cooling medium to leak from the cold plate in a vibratory environment.

In one embodiment, a cold plate for providing cooling to a component can comprise: a top plate comprising a body and a plurality of walls extending from the body, wherein each wall of the plurality of walls includes a recess extending within the wall; and a bottom plate comprising a body and a plurality of walls extending from the body. The top plate is coupled with the bottom plate such that an end portion of each wall of the plurality of walls of the bottom plate is inserted within the recess of each wall of the plurality of walls of the top plate to form an interlocking joint between each wall of the plurality of walls of the top plate and each wall of the plurality of walls of the bottom plate. The cold plate is configured to receive a cooling medium between the top and bottom plates, wherein the cold plate is configured to transfer heat generated from the component to the cooling medium to provide cooling of the component.

In another embodiment, a cold plate can comprise: a top plate comprising a body and a plurality of walls extending from the body, wherein each wall of the plurality of walls includes a recess extending within the wall; and a bottom plate comprising a body and a plurality of walls extending from the body. The top plate is coupled with the bottom plate such that an end portion of each wall of the plurality of walls of the bottom plate is inserted within the recess of each wall of the plurality of walls of the top plate to form an interlocking joint between each wall of the plurality of walls of the top plate and each wall of the plurality of walls of the bottom plate. The cold plate is configured to receive a cooling medium between the top and bottom plates. The cold plate is coupled with the component to support the weight of the component and to transfer heat generated from the component to the cooling medium to provide cooling of the component.

In another embodiment, a cooling system for providing cooling to a component can comprise: a pump; a heat exchanger; a cold plate; and a component that generates heat. The cold plate can comprise: a top plate comprising a body and a plurality of walls extending from the body, wherein each wall of the plurality of walls includes a recess extending within the wall, and a bottom plate coupled with the top plate to receive a cooling medium between the bottom plate and top plate, wherein the bottom plate comprises a body and a plurality of walls extending from the body, wherein the top plate is coupled with the bottom plate such that an end portion of each wall of the plurality of walls of the bottom plate is inserted within the recess of each wall of the plurality of walls of the top plate to form an interlocking joint between each wall of the plurality of walls of the top plate and each wall of the plurality of walls of the bottom plate. The component is coupled with the cold plate. The pump is configured to pump the cooling medium through the cold plate and the heat exchanger. The cold plate is configured to transfer heat generated from the component to the cooling medium to provide cooling of the component.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 8 is a cross-sectional view of the cold plate of FIG. 1 taken along line 8-8 of FIG. 2.

FIG. 8A is an enlarged partial cross-sectional view of the cold plate of FIG. 8 of the portion enclosed by the rectangle 8A in FIG. 8, showing the interlocking joint of the cold plate.

FIG. 9 is a schematic of the cold plate of FIG. 1 assembled in a cooling system.

DETAILED DESCRIPTION OF THE INVENTION

A cold plate is provided for cooling a component coupled with the cold plate. The cold plate can comprise a top plate coupled with a bottom plate to allow a cooling medium to flow between the top and bottom plates to thereby dissipate heat from the component coupled with the cold plate. The top plate can comprise a plurality of walls extending downwardly from the top plate toward bottom plate having a recess extending within each wall of the plurality of walls. The bottom plate can comprise a plurality of walls corresponding to the plurality of walls of the top plate such that the plurality of walls of the bottom plate are configured to insert within the recesses of the plurality of walls of the top plate to form an interlocking joint. Such interlocking joints can be bonded to form a fluid-tight seal to inhibit cooling medium from leaking through the interlocking joints. The plurality of walls of the top and bottom plates can further form one or more compartments for directing the cooling medium through at least a portion of the cold plate. The top or bottom plate of the cold plate can further be coupled with the component to support the weight of the component. In some versions, the cold plate can include one or more slats for providing additional support for the cold plate. Accordingly, a cold plate is described herein that is configured to provide both cooling and support for a component that is sufficiently robust to inhibit a cooling medium to leak from the cold plate in a vibratory environment.

I. An Exemplary Cold Plate Having Interlocking Joints

Figure 1:
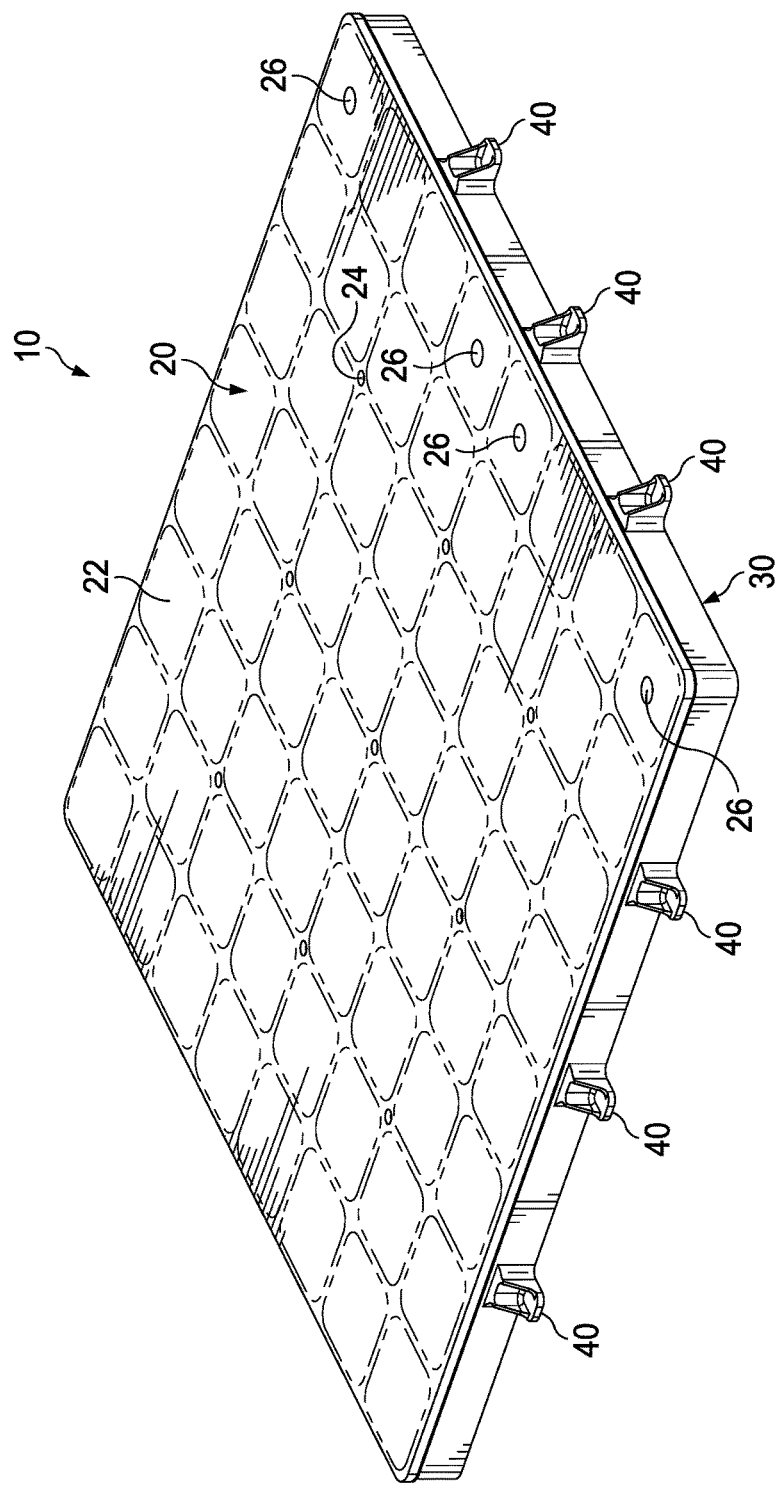
FIG. 1 is a top perspective view of a first exemplary cold plate having interlocking joints.
Figure 2:
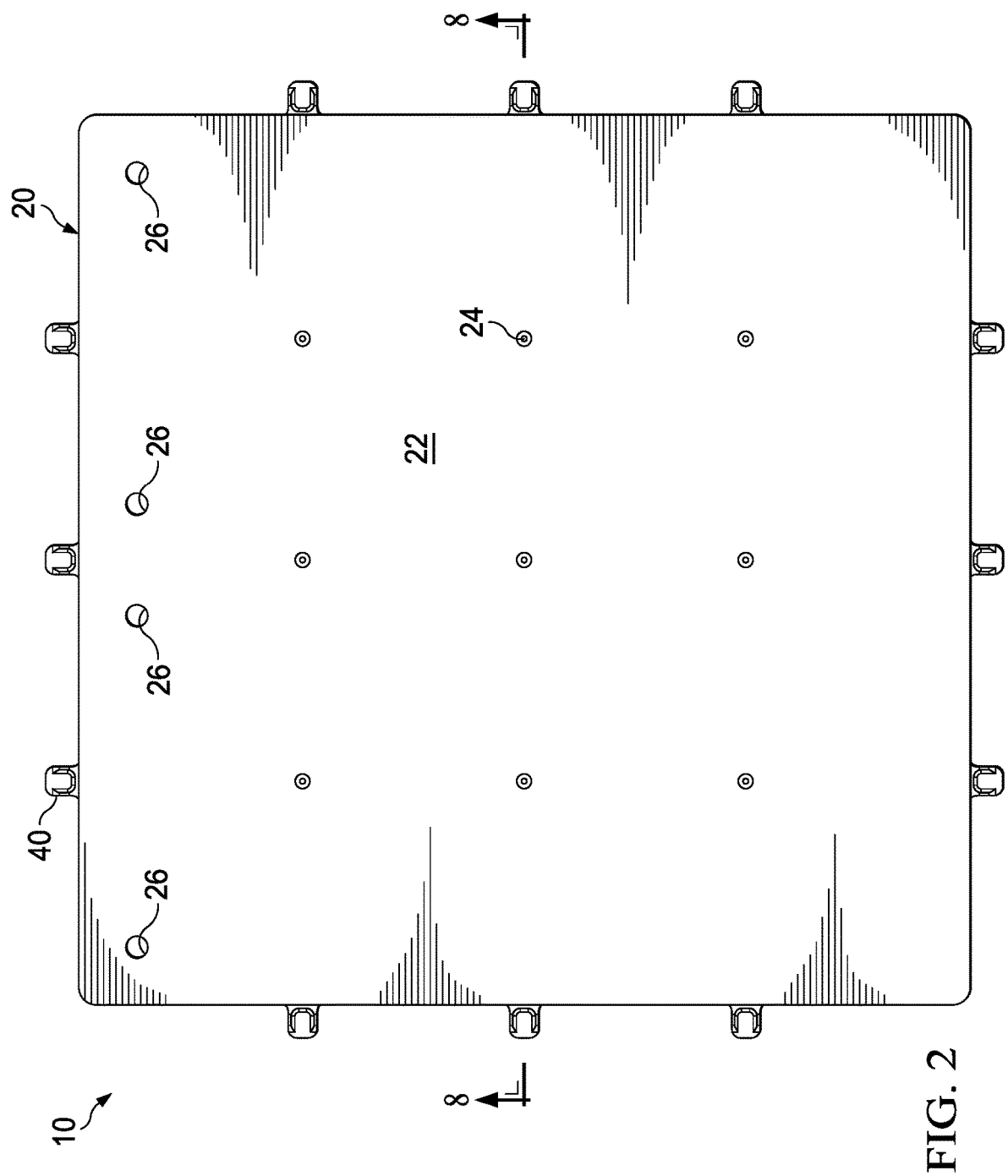
FIG. 2 is a top plan view of the cold plate of FIG. 1.
Figure 3:
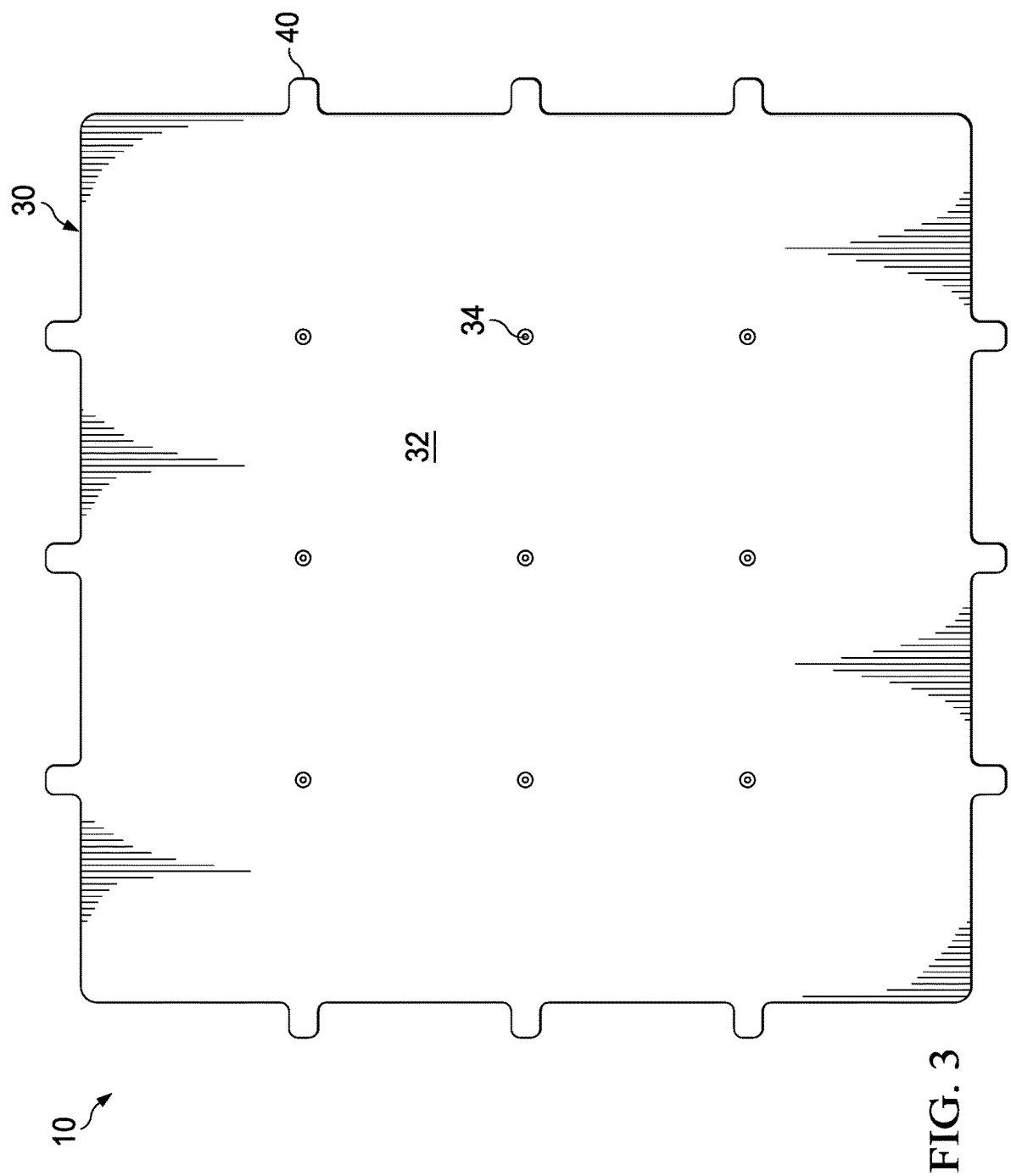
FIG. 3 is a bottom plan view of the cold plate of FIG. 1.

Referring now to FIGS. 1-3, a first exemplary cold plate 10 is shown for providing localized cooling to a component that generates heat, such as a battery or other electrical component, as well as providing support for such component. Cold plate 10 comprises a top plate 20 coupled with a bottom plate 30 via interlocking joints 50 (see FIG. 8) as will be discussed in more detail below. In the illustrated version, top plate 20 is positioned above bottom plate 30 in a substantially parallel relationship relative to bottom plate 30 such that cold plate 10 is configured to receive a cooling medium (e.g., air, water, glycol solutions, etc.) between top plate 20 and bottom plate 30. Top plate 20 and bottom plate 30 can be made from any suitable thermally conductive material, such as aluminum, copper, steel, or any other suitable metal. In some versions, it may be desirable to provide a thermally conductive material that is also lightweight (e.g., aluminum) in aircraft applications.

Figure 4:
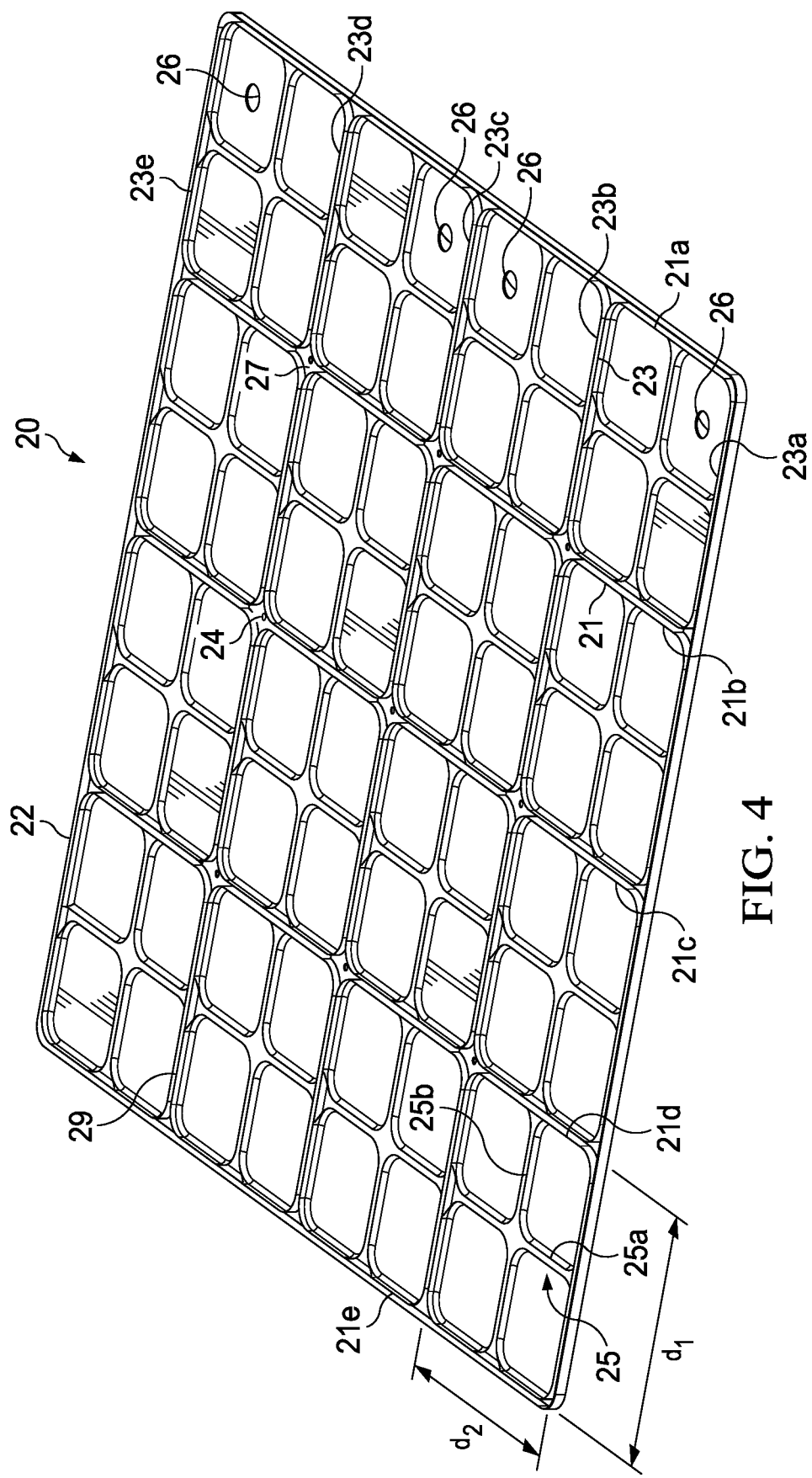
FIG. 4 is a bottom perspective view of a top plate of the cold plate of FIG. 1.
Figure 5:
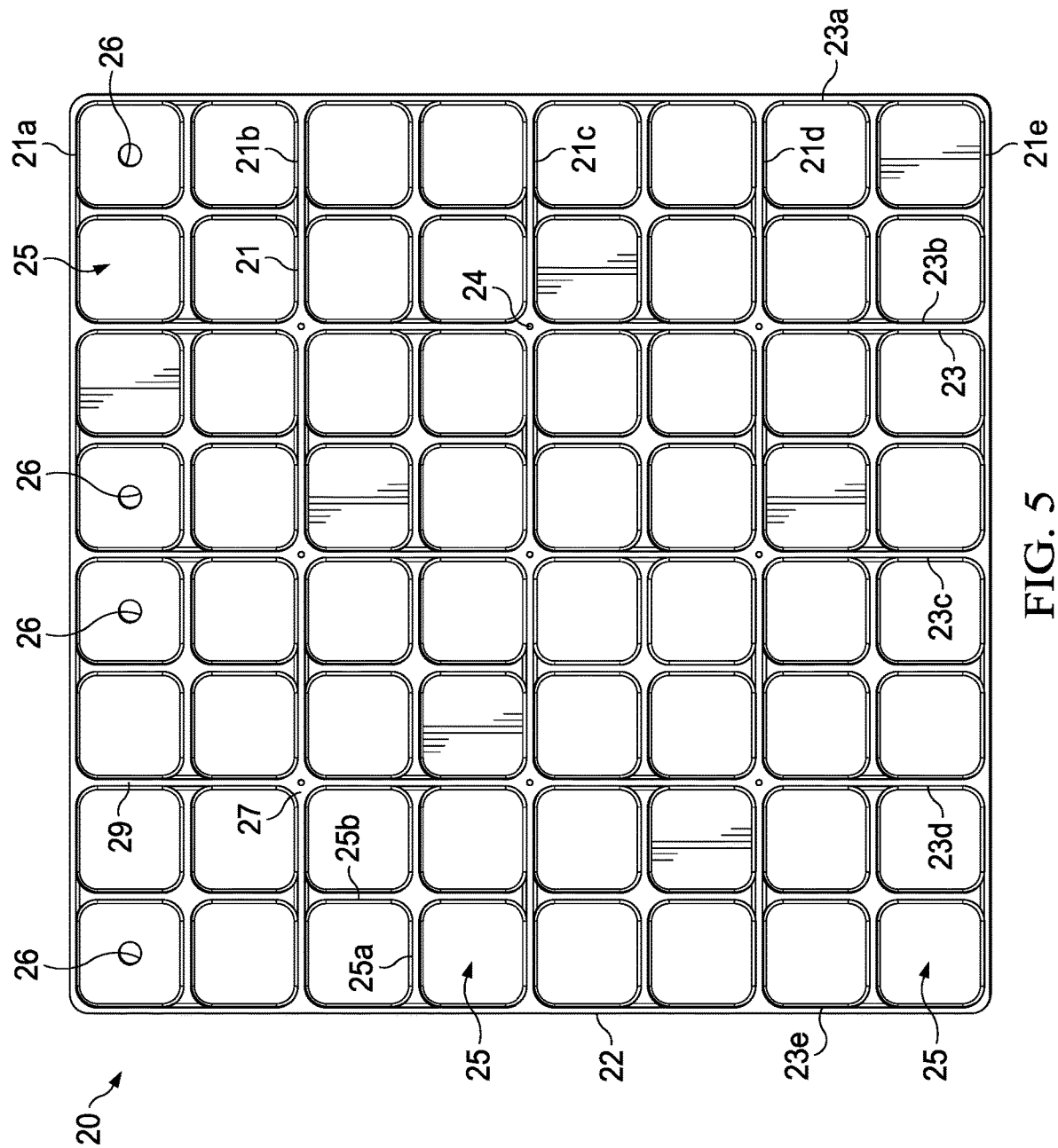
FIG. 5 is a bottom plan view of the top plate of FIG. 4.

FIGS. 4-5 show top plate 20 in more detail. Top plate 20 of the illustrated version comprises a body 22 having two or more ports 26 that are configured to allow the cooling medium to flow into and/or out of cold plate 10 through ports 26. In the illustrated version, body 22 includes four ports 26 such that one or two ports 26 can be used as an input of the cooling medium within cold plate 10 and another one or two ports 26 can be used as an output of the cooling medium out of cold plate 10. Still other suitable configurations for ports 26 will be apparent to one with ordinary skill in the art in view of the teachings herein. For instance, additionally or alternatively, ports 26 can be provided through bottom plate 30.

Top plate 20 further comprises a plurality of lateral walls 21 and a plurality of longitudinal walls 23 extending outwardly from body 22 toward bottom plate 30. Walls 21, 23 are configured to provide additional structure for top plate 20 and/or to couple top plate 20 with bottom plate 30, as will be discussed in more detail below. Each lateral wall 21 extends laterally along body 22 with each lateral wall 21 spaced apart from one another at a distance $d_1$. Each longitudinal wall 23 extends longitudinally along body 22, transversely relative to lateral walls 21, with each longitudinal wall 23 spaced apart from one another at a distance dz. In the illustrated version, distances $d_1$, $d_2$ are substantially equal between each wall 21, 23. In some other versions, distances $d_1$, $d_2$ can differ between one or more walls 21, 23. As shown in FIGS. 4-5, top plate 20 includes five lateral walls 21a, 21b, 21c, 21d, 21e and five longitudinal walls 23a, 23b, 23c, 23d, 23e to form a generally square body 22, though any other suitable number of walls 21, 23 can be used to form any other suitable shaped body 22 (e.g., rectangle, circular, triangular, etc.).

Lateral walls 21 and longitudinal walls 23 are thereby configured to intersect with each other at intersection points 27. Top plate 20 includes an opening 24 extending through body 22 at each intersection point 27. Openings 24 are configured to receive a fastener (e.g., a screw, a bolt, a nail, etc.) through openings 24 to couple top plate 20 and/or bottom plate 30 with a component for cooling. While the illustrated version shows an opening 24 at each intersection point 27, any other suitable number of openings 24 can be used for coupling cold plate 10 with a component. Each wall 21, 23 further includes a recess 29 extending inwardly within each wall 21, 23 that are configured to receive bottom plate 30.

As shown in FIGS. 4-5, lateral walls 21 and longitudinal walls 23 are arranged to form a chamber 25 between each pair of adjacent lateral walls 21 and each pair of adjacent longitudinal walls 23. For illustrative purposes, a chamber 25 is formed between lateral walls 21a, 21b and longitudinal walls 23a, 23b. Each chamber 25 comprises a plurality of ribs 25a, 25b extending outwardly from body 22 within chamber 25. As shown, a lateral rib 25a extends laterally within a central portion of chamber 25 and a longitudinal rib 25b extends longitudinally within a central portion of chamber 25, transverse relative to lateral rib 25a. Ribs 25a, 25b extend only within a portion of chamber 25 such that ribs 25a, 25b have a smaller thickness than walls 21, 23. Ribs 25a, 25b may provide additional support structure for top plate 20, although ribs 25a, 25b are optional. In some versions, top plate 20 can be manufactured as an integral component with chambers 25 bored out from the integral component. In some other versions, body 22, walls 21, 23 and/or ribs 25a, 25b of top plate 20 can be provided as separate components that are assembled together to form top plate 20.

Figure 6:
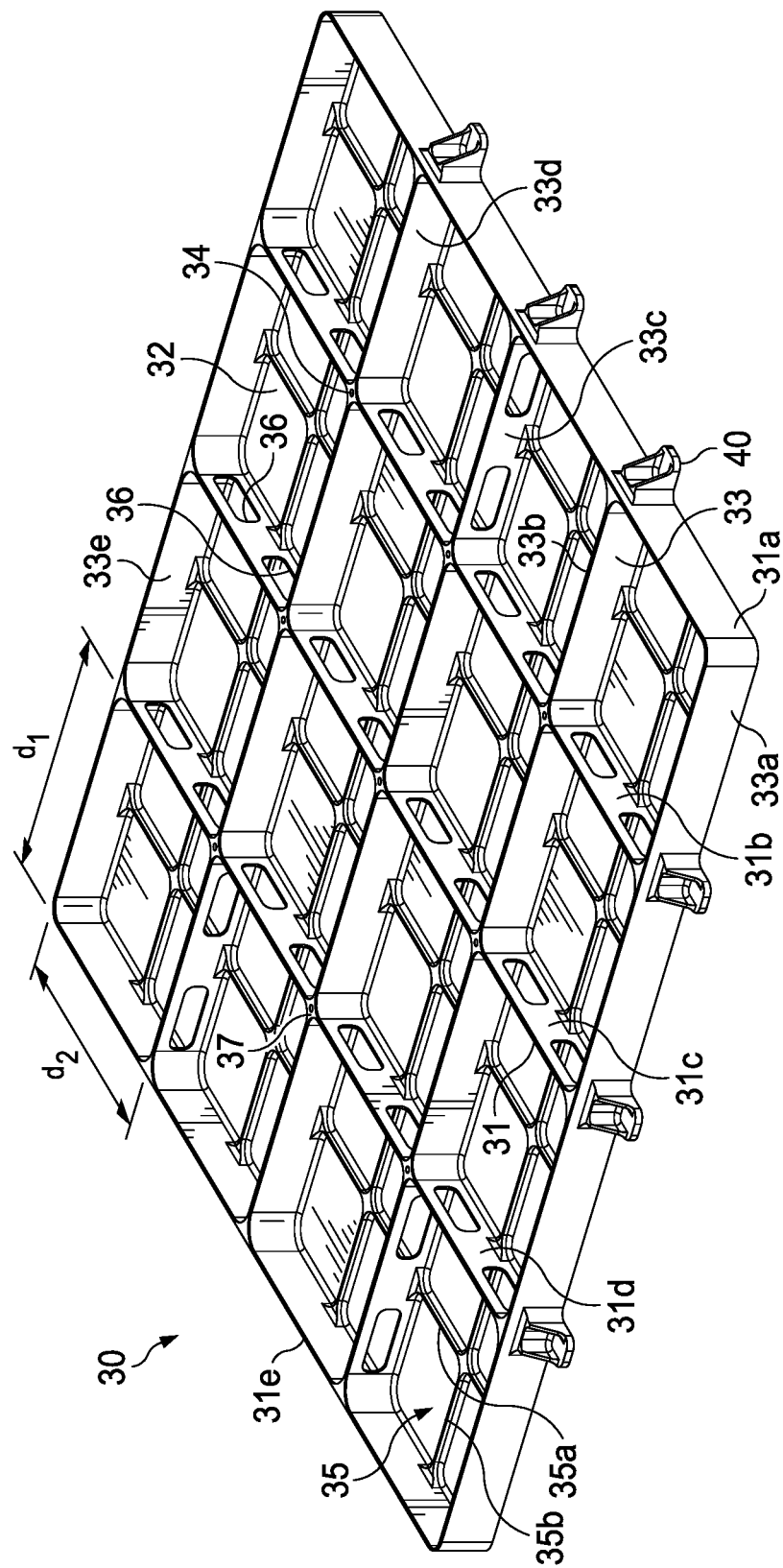
FIG. 6 is a top perspective view of a bottom plate of the cold plate of FIG. 1.
Figure 7:
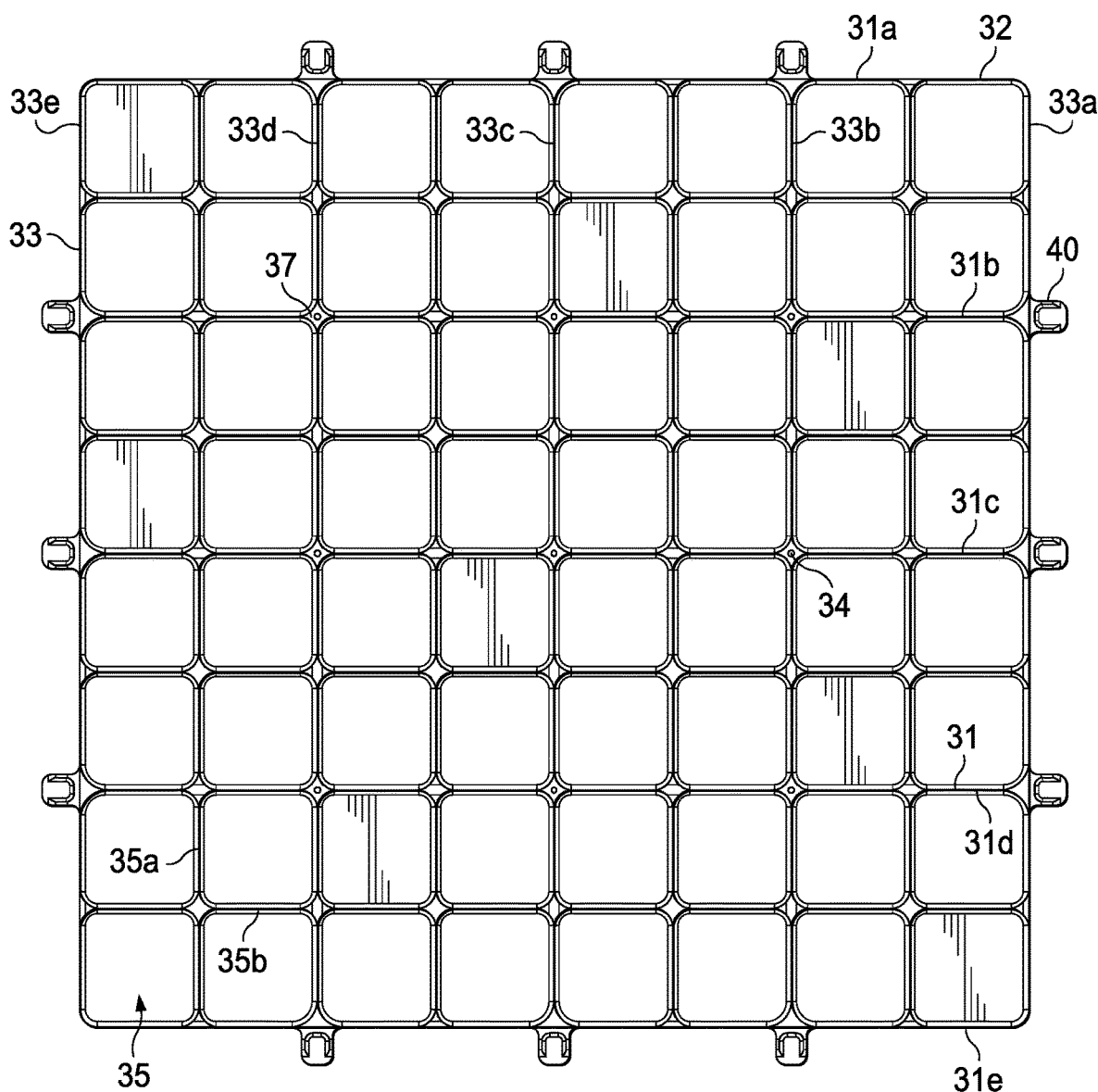
FIG. 7 is a top plan view of the bottom plate of FIG. 6.

FIGS. 6-7 show bottom plate 30 in more detail. Bottom plate 30 of the illustrated version comprises a body 32 having a plurality of lateral walls 31 and a plurality of longitudinal walls 33 extending outwardly from body 32 toward top plate 20. Walls 31, 33 are configured to provide a flow path for a cooling medium, additional structure for bottom plate 30, and/or to couple bottom plate 30 with top plate 20, as will be discussed in more detail below. Each lateral wall 31 extends laterally along body 32 with each lateral wall 31 spaced apart from one another at a distance $d_1$. Each longitudinal wall 33 extends longitudinally along body 32, transversely relative to lateral walls 31, with each longitudinal wall 33 spaced apart from one another at a distance $d_2$. In the illustrated version, distances $d_1$, $d_2$ are substantially equal between each wall 31, 33. In some other version, distances $d_1$, $d_2$ can differ between one or more walls 31, 33.

As shown in FIGS. 6-7, bottom plate 30 includes five lateral walls 31a, 31b, 31c, 31d, 31e and five longitudinal walls 33a, 33b, 33c, 33d, 33e to form a generally square body 32, though any other suitable number of walls 31, 33 can be used to form any other suitable shaped body 32 (e.g., rectangle, circular, triangular, etc.). Exterior walls 31a, 31e, 33a, 33e of bottom plate 30 of the illustrated version include a plurality of couplings 40 extending outwardly from exterior walls 31a, 31e, 33a, 33e that are configured to couple bottom plate 30 with another structure to support cold plate 30. For instance, couplings 40 can receive a fastener (e.g., a screw, a bolt, a nail, an adhesive, etc.) to couple bottom plate 30 with another structure within an aircraft to maintain the position of cold plate 10 within the aircraft. Still other suitable configurations for mounting cold plate 10 will be apparent to one with ordinary skill in the art in view of the teachings herein. For instance, additionally or alternatively, couplings 40 can be provided on top plate 20.

Lateral walls 31 and longitudinal walls 33 of bottom plate 30 are configured to intersect with each other at intersection points 37. Bottom plate 30 includes an opening 34 extending through body 32 at each intersection point 37. Openings 34 can be aligned with openings 24 of top plate 20 and are configured to receive a fastener (e.g., a screw, a bolt, a nail, etc.) through openings 34 to couple top plate 20 and/or bottom plate 30 with a component for cooling. While the illustrated version shows an opening 34 at each intersection point 37, any other suitable number of openings 34 can be used for coupling cold plate 10 with a component.

As shown in FIGS. 6-7, lateral walls 31 and longitudinal walls 33 are arranged to form a chamber 35 between each pair of adjacent lateral walls 31 and each pair of adjacent longitudinal walls 33. For illustrative purposes, a chamber 35 is formed between lateral walls 31a, 31b and longitudinal walls 33a, 33b. Chambers 35 of bottom plate 30 are thereby configured to receive a cooling medium within chambers 35. In the illustrated version, one or more channels 36 are formed through one or more select walls 31, 33 of bottom plate 30 that are configured to allow the cooling medium to flow through channels 36 between chambers 35. For instance, a pair of channels 36 is formed through each interior lateral wall 31b, 31c, 31d in each chamber 35. A pair of channels 36 are also formed through interior longitudinal walls 33b, 33c, 33d at an end portion of each interior longitudinal wall 33b, 33c, 33d. As best shown in FIG. 6, channels 36 of interior walls 33b, 33e are positioned at an opposite end portion relative to channels 36 of interior wall 33d. Still other suitable configurations for channels 36 will be apparent to one with ordinary skill in the art in view of the teachings herein for allowing the cooling medium to flow within cold plate 10.

Each chamber 35 comprises a plurality of ribs 35a, 35b extending outwardly from body 32 within chamber 35. As shown, a lateral rib 35a extends laterally within a central portion of chamber 35 and a longitudinal rib 35b extends longitudinally within a central portion of chamber 35, transverse relative to lateral rib 35a. Ribs 35a, 35b extend only within a portion of chamber 35 such that ribs 35a, 35b have a smaller thickness than walls 31, 33. Ribs 35a, 35b may provide additional support structure for bottom plate 30, although ribs 35a, 35b are optional. In some versions, bottom plate 30 can be manufactured as an integral component with chambers 35 bored out from the integral component. In some other versions, body 32, walls 31, 33 and/or ribs 35a, 35b of bottom plate 30 can be provided as separate components that are assembled together to form bottom plate 30.

As shown in FIGS. 8-8A, top plate 20 is assembled with bottom plate 30 to align walls 21, 23 of top plate 20 with the respective walls 31, 33 of bottom plate 30 to form an interlocking joint 50 between each wall 21, 23 of top plate 20 and each wall 31, 33 of bottom plate 30. As best seen in FIG. 8A, each interlocking joint 50 comprises a pair of protrusions 28 extending downwardly from each wall 21, 23 of top plate 20 that form a recess 29 therebetween. An end portion of each wall 31, 33 of bottom plate 30 is insertable within recess 29 of each wall 21, 23 of top plate 20 such a portion of walls 21, 23 of top plate 20 enclose a portion of walls 31, 33 of bottom plate to interlock walls 21, 23, 31, 33 to form an interlocking joint 50. Interlocking joints 50 are thereby formed laterally along cold plate 10 between each lateral wall 21 of top plate 20 and each lateral wall 31 of bottom plate 30 and longitudinally along cold plate 10 between each longitudinal wall 23 of top plate 20 and each longitudinal wall 33 of bottom plate 30. Accordingly, walls 21, 23 of top plate 20 and walls 31, 33 of bottom plate 30 align chambers 25 of top plate 20 with chambers 35 of bottom plate 30 to form a plurality of compartments 15 within cold plate 10 for receiving the cooling medium therein. Top plate 20 can be bonded, such as with epoxy, friction stir welded, fasteners, etc., with bottom plate 30 at interlocking joints 50 to provide a fluid-tight seal between walls 21, 23 of top plate 20 and walls 31, 33 of bottom plate 30. Such interlocking joints 50 can be configured to provide the fluid-tight seal to inhibit the cooling medium from leaking from cold plate 10 to the component supported by cold plate 10 in a vibrational environment, such as during operation of an aircraft. For instance, cold plate 10 can be configured to operate in a vibrational range between about 0 Hertz and about 30 Hertz, though any other suitable ranges can be used.

In addition to providing localized cooling of a component, cold plate 10 is configured to support the weight of such component. For instance, cold plate 10 can have a height between about ½ and about 2 inches, although any other suitable dimensions can be used, such that cold plate 10 can support the weight of a component (e.g., a battery or other electrical component) and allow the cooling medium to flow through cold plate 10. The length and/or width of cold plate 10 can vary to provide a sufficient surface area for cooling the component. Body 22, 32 and/or walls 21, 23, 31, 33 of top and/or bottom plate 20, 30 can have a thickness between about 1 millimeters and about 2 millimeters, although other suitable dimensions can be used such that cold plate 10 can support the weight of a component. The thickness of cold plate 10, bodies 22, 32, and/or walls 21, 23, 31, 33 can vary such that cold plate 10 can be configured to support components having varying weights. For instance, cold plate 10 can be configured to support the weight of a component between about 0 pounds and about 350 pounds, though other suitable weights can be used. In some versions, cold plate 10 is further configured to withstand a crash load requirement of an aircraft of about 20 times the acceleration of gravity such that cold plate is configured to withstand about 7,000 pounds. Accordingly, cold plate 10 is configured to provide both cooling and support for the component, which can decrease the amount of parts needed. This can conserve weight and/or space in an aircraft.

Referring to FIG. 9, cold plate 10 can be incorporated into a cooling system 70 for providing cooling to a component. In the illustrated version, cold plate 10 is coupled with a battery 60, although any other suitable electrical component that generates heat can be used. For instance, battery 60 can be mounted on top plate 20 or bottom plate 30 of cold plate 10 such that cold plate 10 is configured to support battery 60. Battery 60 can be attached to top plate 20 or bottom plate 30 by inserting fasteners through a housing of battery 60 and openings 24, 34 of top and/or bottom plate 30 to maintain the position of battery 60 relative to cold plate 10. Still other suitable methods for attaching battery 60 with cold plate 10 will be apparent to one with ordinary skill in the art in view of the teachings herein. Cold plate 10 is then coupled with a pump 62, a heat exchanger 64, and/or a reservoir 66. Pump 62 is configured to pump the cooling medium stored within reservoir 66 through cold plate 10 and heat exchanger 64. Heat exchanger 64 is configured to cool the cooling medium. Accordingly, pump 62 can pump the cooling medium that has been cooled by heat exchanger into cold plate 10 to provide cooling of battery 60. For instance, heat generated from battery 60 flows by conduction through top or bottom plate 20, 30 of cold plate 10. The heat then flows by convection from an internal surface of top or bottom plate 20, 30 to the cooling medium flowing through cold plate 10. Pump 62 can then pump the heated cooling medium to heat exchanger 64 to cool the heated cooling medium, such that it can be cycled back to cold plate 10 to continue cooling battery 62.

Figure 10:
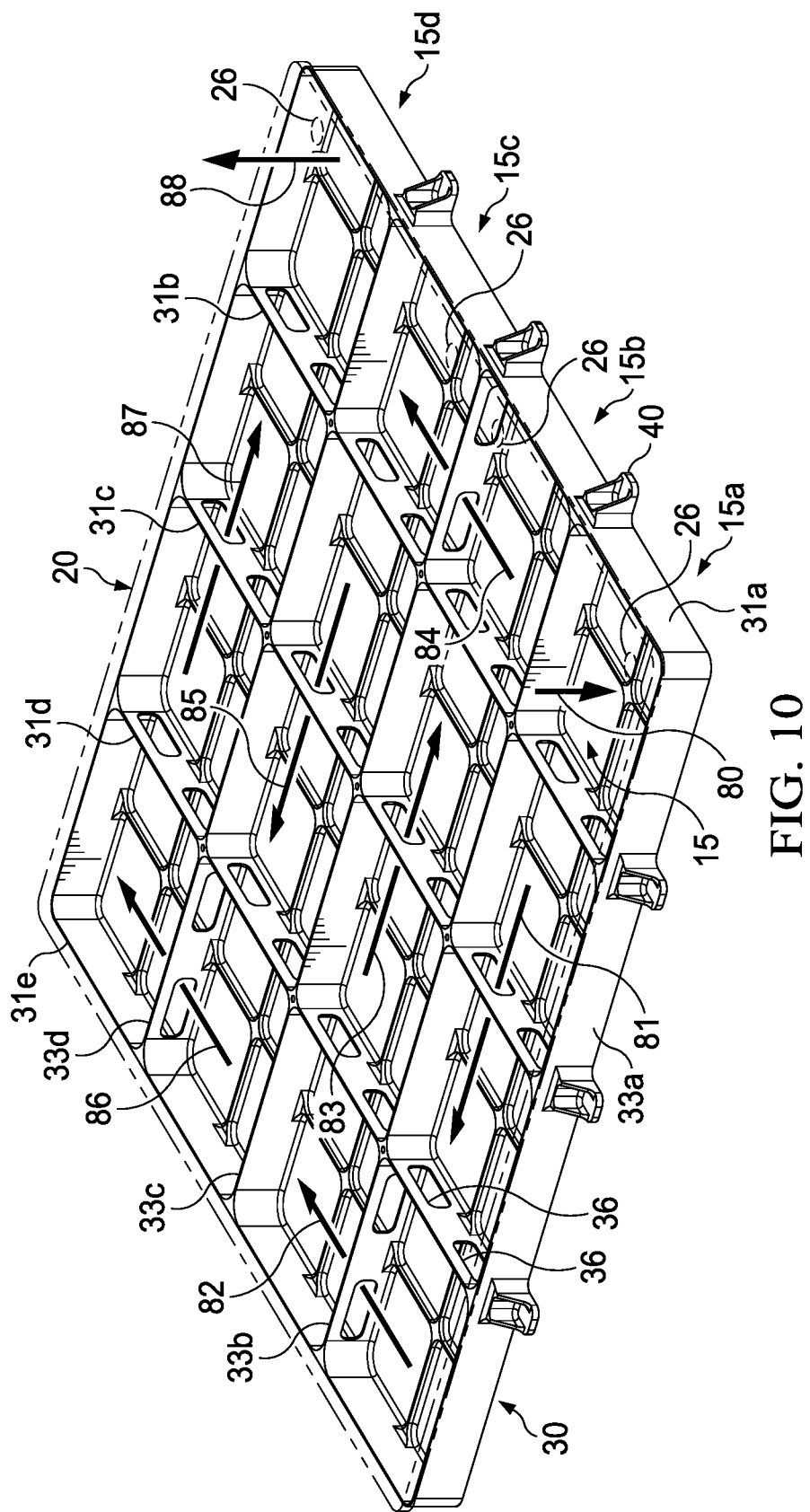
FIG. 10 is a top perspective view of the cold plate of FIG. 1 with the top plate of the cold plate shown as being transparent for illustrative purposes, showing a flow path of a cooling medium through the cold plate.

For instance, an exemplary flow path of the cooling medium through compartments 15 of cold plate 10 is shown in FIG. 10. In the illustrated version, the cooling medium can enter cold plate 10 through one or more ports 26 of cold plate 10 as shown by arrow 80. The cooling medium can then flow through channels 36 of the internal lateral walls 31b, 31c, 31d of bottom plate 30 through a first row of compartments 15a of cold plate 10 as shown by arrow 81. The cooling medium can then flow through channels 36 of longitudinal wall 33b, as shown by arrow 82, and through a second row of compartments 15b of cold plate 10 as shown by arrow 83. The cooling medium can then flow through channels 36 of longitudinal wall 33c, as shown by arrow 84, and through a third row of compartments 15c of cold plate 10 as shown by arrow 85. The cooling medium can then flow through channels 36 of longitudinal wall 33d, as shown by arrow 86, and through a fourth row of compartments 15d of cold plate 10 as shown by arrow 87. Compartments 15 are thereby configured to direct the cooling medium through cold plate 10. The cooling medium can then exit cold plate 10 through one or more ports 26 of cold plate 10 as shown by arrow 88. The flow of the cooling medium through cold plate 10 can thereby provide cooling to battery 60 (see FIG. 9). Still other suitable configurations for cold plate 10 will be apparent to one with ordinary skill in the art in view of the teachings herein. For instance, cold plate 10 can have more or less compartments 15 to for directing the cooling medium through all or a portion of cold plate 10.

II. An Exemplary Cold Plate Having Support Slats

Figure 11:
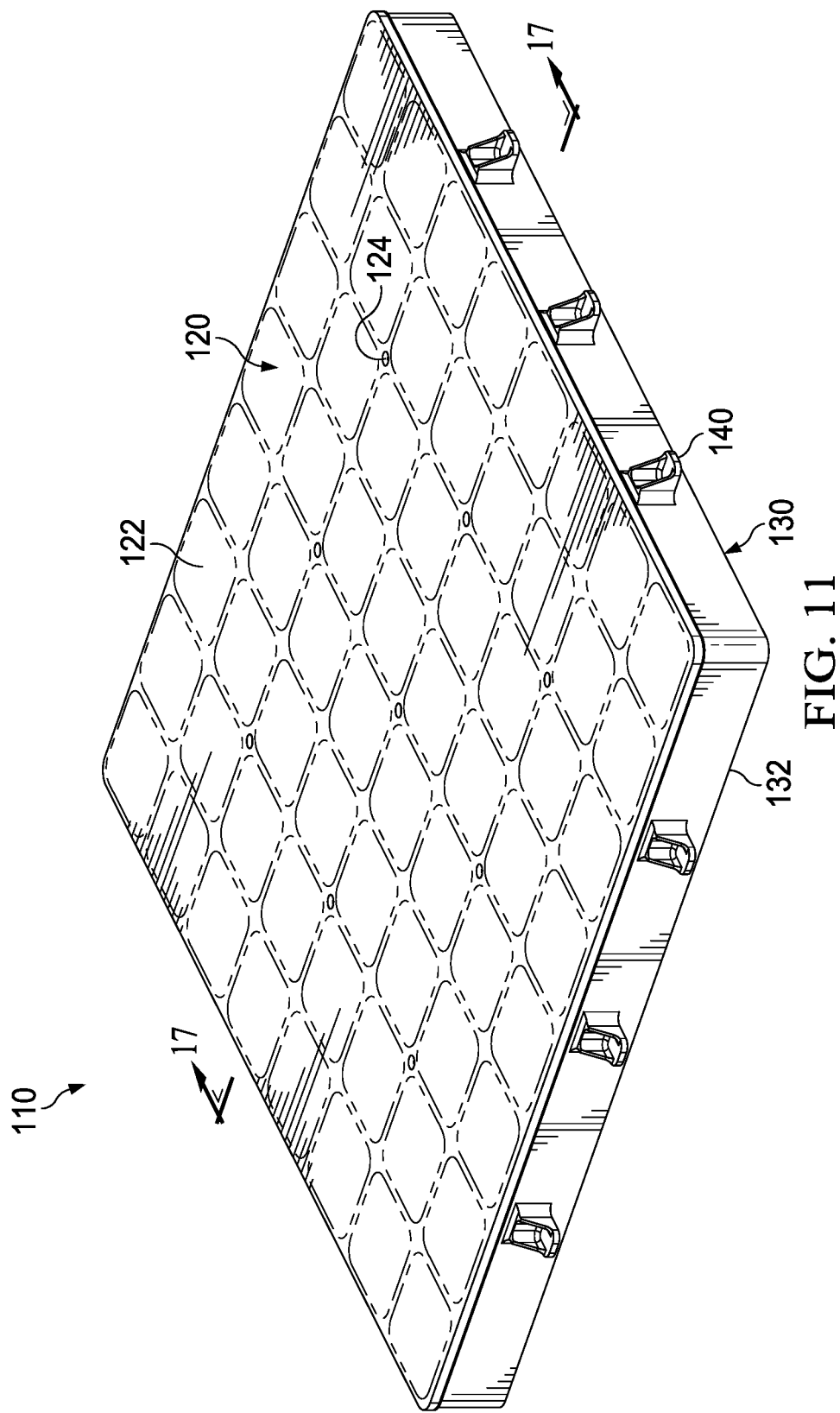
FIG. 11 is a top perspective view of a second exemplary cold plate having interlocking joints.
Figure 12:
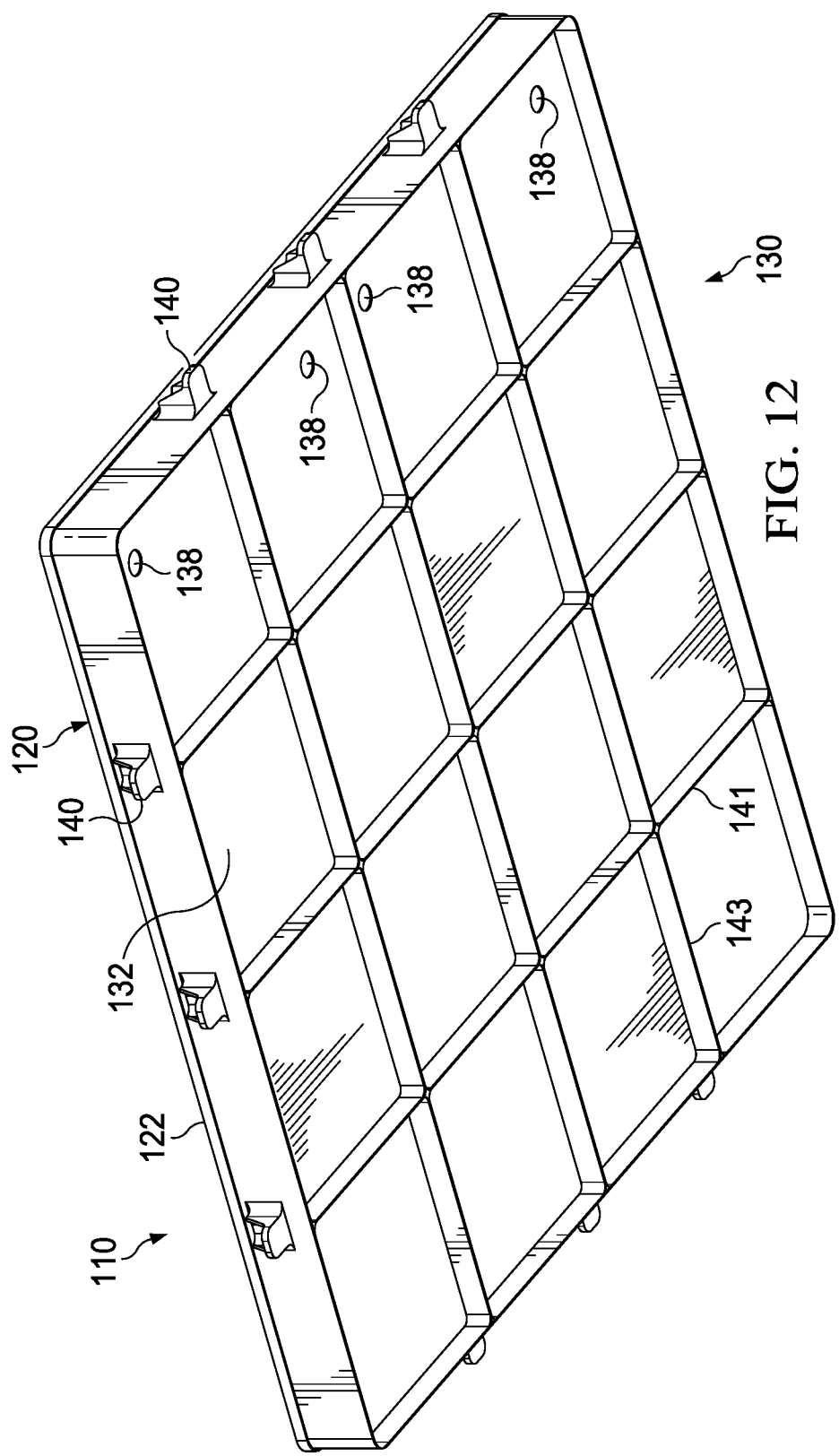
FIG. 12 is a bottom perspective view of the cold plate of FIG. 11.

In some versions, it may be desirable to provide additional support for cold plate 10 such that cold plate 10 can be configured to support additional weight. Accordingly, a second exemplary cold plate 110 is shown in FIGS. 11-12. Cold plate 110 is similar to cold plate 10 in that cold plate 110 comprises a top plate 120 coupled with a bottom plate 130 via interlocking joints 50 (see FIG. 8) as described above. In the illustrated version, top plate 120 is positioned above bottom plate 130 in a substantially parallel relationship relative to bottom plate 130 such that cold plate 110 is configured to receive a cooling medium (e.g., air, water, glycol solutions, etc.) between top plate 120 and bottom plate 130. Top plate 120 and bottom plate 130 can be made from any suitable thermally conductive material, such as aluminum, copper, steel, or any other suitable metal. In some versions, it may be desirable to provide a thermally conductive material that is also lightweight (e.g., aluminum) in aircraft applications.

Figure 13:
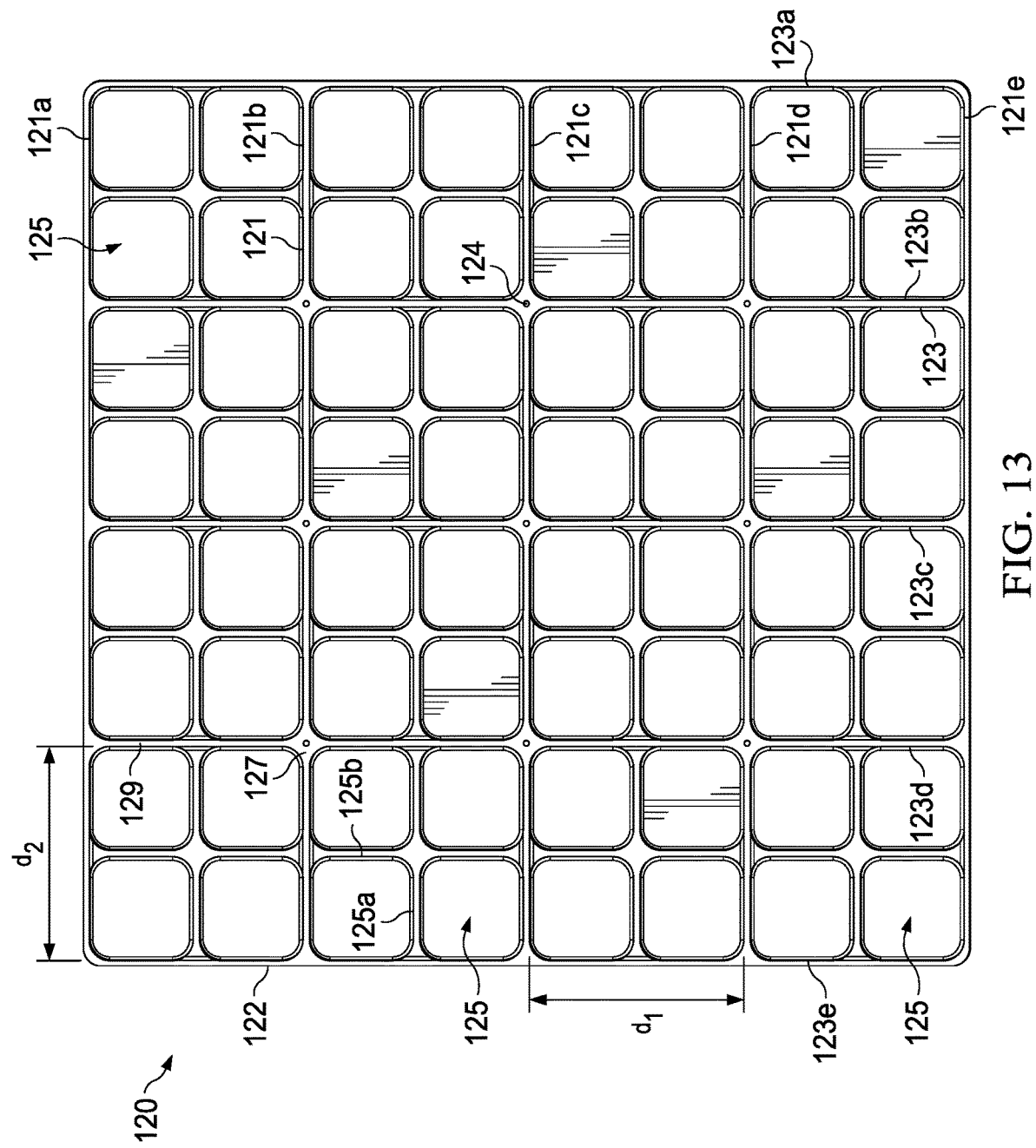
FIG. 13 is a bottom plan view of a top plate of the cold plate of FIG. 11.

FIG. 13 shows top plate 120 in more detail. Top plate 120 of the illustrated version comprises a plurality of lateral walls 121 and a plurality of longitudinal walls 123 extending outwardly from body 122 toward bottom plate 130. Walls 121, 123 are configured to provide additional structure for top plate 120 and/or to couple top plate 120 with bottom plate 130, as will be discussed in more detail below. Each lateral wall 121 extends laterally along body 122 with each lateral wall 121 spaced apart from one another at a distance $d_1$. Each longitudinal wall 123 extends longitudinally along body 122, transversely relative to lateral walls 121, with each longitudinal wall 123 spaced apart from one another at a distance $d_2$. In the illustrated version, distances $d_1$, $d_2$ are substantially equal between each wall 121, 123. In some other versions, distances $d_1$, $d_2$ can differ between one or more walls 121, 123. As shown in FIG. 13, top plate 120 includes five lateral walls 121a, 121b, 121c, 121d, 121e and five longitudinal walls 123a, 123b, 123c, 123d, 123e to form a generally square body 122, though any other suitable number of walls 121, 123 can be used to form any other suitable shaped body 122 (e.g., rectangle, circular, triangular, etc.).

Lateral walls 121 and longitudinal walls 123 are thereby configured to intersect with each other at intersection points 127. Top plate 120 includes an opening 124 extending through body 122 at each intersection point 127. Openings 124 are configured to receive a fastener (e.g., a screw, a bolt, a nail, etc.) through openings 124 to couple top plate 120 and/or bottom plate 130 with a component for cooling. While the illustrated version shows an opening 124 at each intersection point 127, any other suitable number of openings 124 can be used for coupling cold plate 110 with a component. Each wall 121, 123 further includes a recess 129 extending inwardly within each wall 121, 123 that are configured to receive bottom plate 130.

As shown in FIG. 13, lateral walls 121 and longitudinal walls 123 are arranged to form a chamber 125 between each pair of adjacent lateral walls 121 and each pair of adjacent longitudinal walls 123. For illustrative purposes, a chamber 125 is formed between lateral walls 121a, 121b and longitudinal walls 123a, 123b. Each chamber 125 comprises a plurality of ribs 125a, 125b extending outwardly from body 122 within chamber 125. As shown, a lateral rib 125a extends laterally within a central portion of chamber 125 and a longitudinal rib 125b extends longitudinally within a central portion of chamber 125, transverse relative to lateral rib 125a. Ribs 125a, 125b extend only within a portion of chamber 125 such that ribs 125a, 125b have a smaller thickness than walls 121, 123. Ribs 125a, 125b may provide additional support structure for top plate 120, although ribs 125a, 125b are optional. In some versions, top plate 120 can be manufactured as an integral component with chambers 125 bored out from the integral component. In some other versions, body 122, walls 121, 123 and/or ribs 125a, 125b of top plate 120 can be provided as separate components that are assembled together to form top plate 120.

Figure 14:
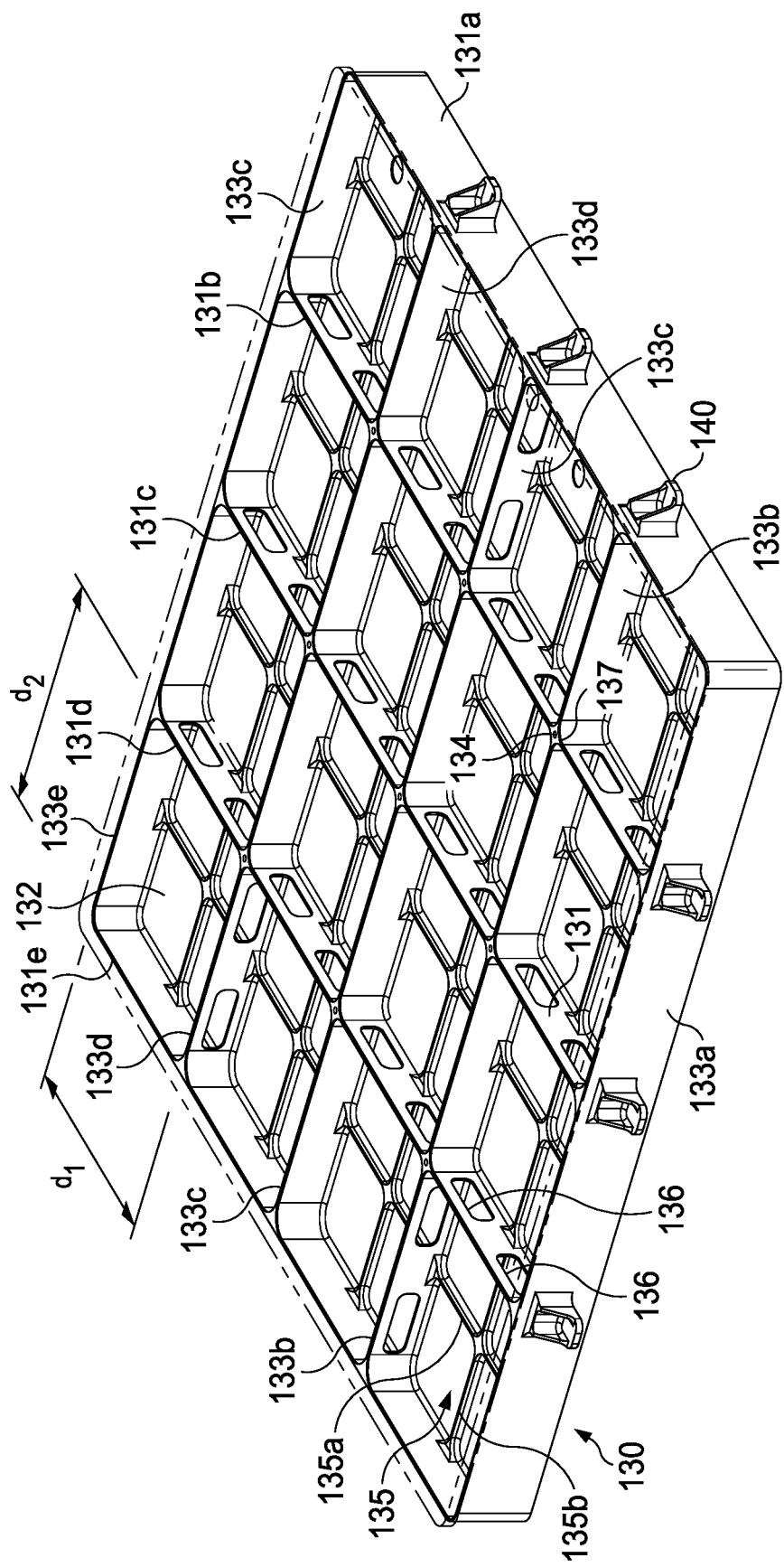
FIG. 14 is a top perspective view of a bottom plate of the cold plate of FIG. 11.
Figure 15:
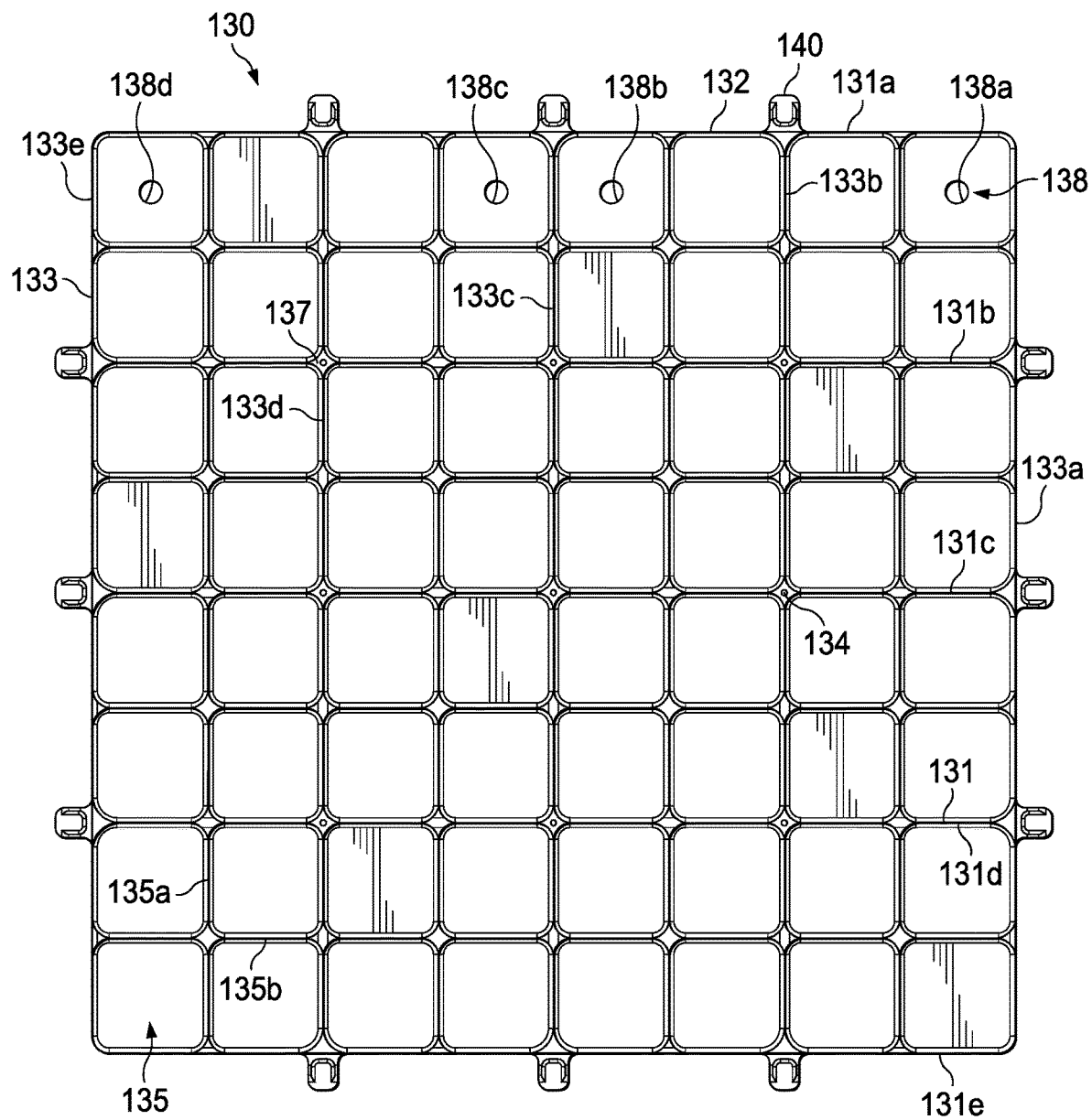
FIG. 15 is a top plan view of the bottom plate of FIG. 14.
Figure 16:
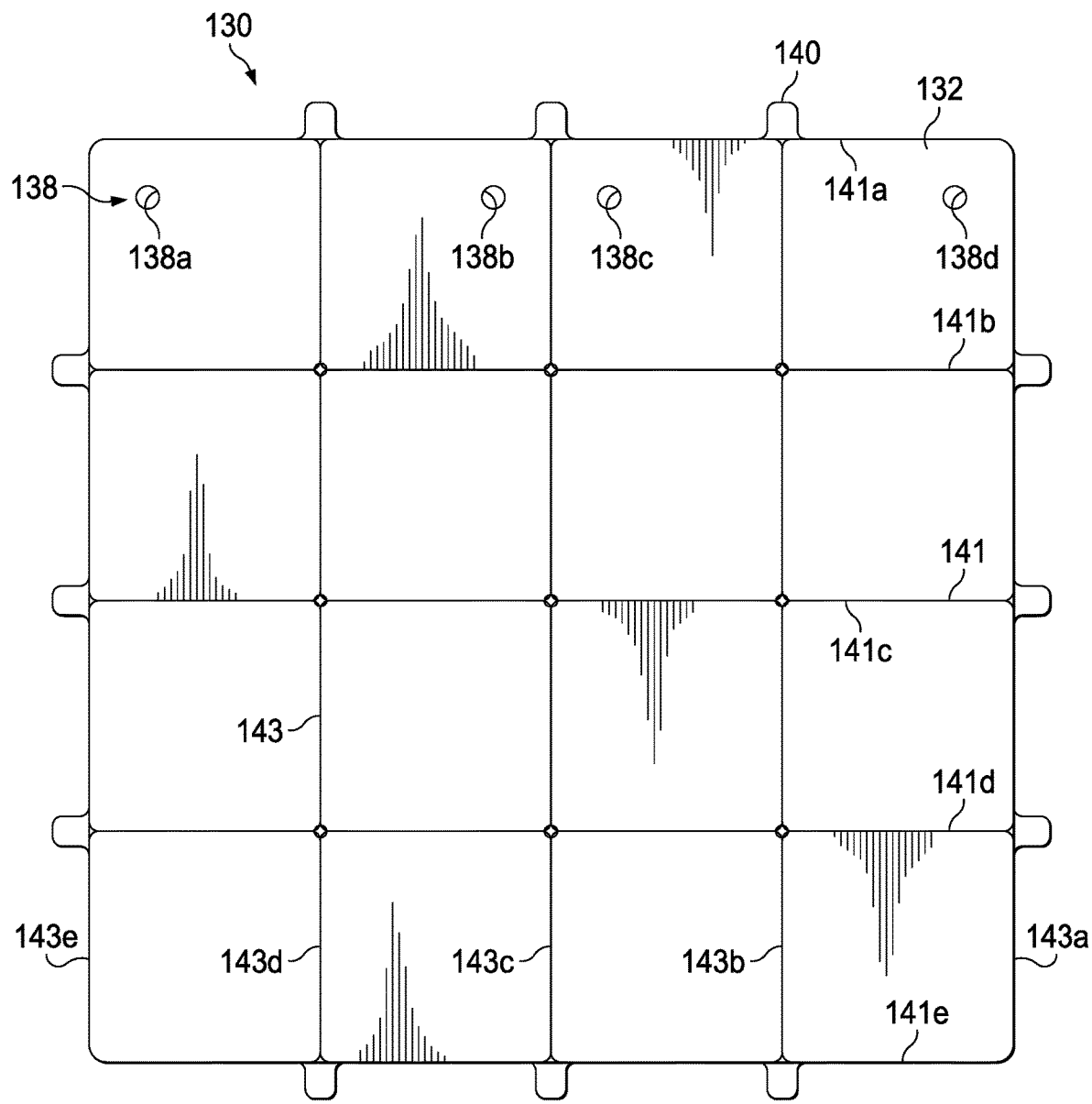
FIG. 16 is a bottom plate view of the bottom plate of FIG. 14.

FIGS. 14-16 show bottom plate 130 in more detail. Bottom plate 130 of the illustrated version comprises a body 132 having two or more ports 138 that are configured to allow the cooling medium to flow into and/or out of cold plate 110 through ports 138. In the illustrated version, body 132 includes four ports 138 such that one or two ports 138 can be used as an input of the cooling medium within cold plate 110 and another one or two ports 138 can be used as an output of the cooling medium out of cold plate 110. Still other suitable configurations for ports 138 will be apparent to one with ordinary skill in the art in view of the teachings herein. For instance, additionally or alternatively, ports 138 can be provided through top plate 120.

Bottom plate 130 of the illustrated version further comprises a plurality of lateral walls 131 and a plurality of longitudinal walls 133 extending outwardly from body 132 toward top plate 120. Walls 131, 133 are configured to provide a flow path for a cooling medium, additional structure for bottom plate 130, and/or to couple bottom plate 130 with top plate 120, as will be discussed in more detail below. Each lateral wall 131 extends laterally along body 132 with each lateral wall 131 spaced apart from one another at a distance $d_1$. Each longitudinal wall 133 extends longitudinally along body 132, transversely relative to lateral walls 131, with each longitudinal wall 133 spaced apart from one another at a distance $d_2$. In the illustrated version, distances $d_1$, $d_2$ are substantially equal between each wall 131, 133. In some other version, distances $d_1$, $d_2$ can differ between one or more walls 131, 133.

As shown in FIGS. 14-15, bottom plate 130 includes five lateral walls 131a, 131b, 131c, 131d, 131e and five longitudinal walls 133a, 133b, 133c, 133d, 133e to form a generally square body 132, though any other suitable number of walls 131, 133 can be used to form any other suitable shaped body 132 (e.g., rectangle, circular, triangular, etc.). Exterior walls 131a, 131e, 133a, 133e of bottom plate 130 of the illustrated version include a plurality of couplings 140 extending outwardly from exterior walls 131a, 131e, 133a, 133e that are configured to couple bottom plate 130 with another structure to support cold plate 130. For instance, couplings 140 can receive a fastener (e.g., a screw, a bolt, a nail, an adhesive, etc.) to couple bottom plate 130 with another structure within an aircraft to maintain the position of cold plate 110 within the aircraft. Still other suitable configurations for mounting cold plate 110 will be apparent to one with ordinary skill in the art in view of the teachings herein. For instance, additionally or alternatively, couplings 140 can be provided on top plate 120.

Lateral walls 131 and longitudinal walls 133 of bottom plate 130 are configured to intersect with each other at intersection points 137. Bottom plate 130 includes an opening 134 extending through body 132 at each intersection point 137. Openings 134 can be aligned with openings 124 of top plate 120 and are configured to receive a fastener (e.g., a screw, a bolt, a nail, etc.) through openings 134 to couple top plate 120 and/or bottom plate 130 with a component for cooling. While the illustrated version shows an opening 134 at each intersection point 137, any other suitable number of openings 134 can be used for coupling cold plate 110 with a component.

As shown in FIGS. 14-15, lateral walls 131 and longitudinal walls 133 are arranged to form a chamber 135 between each pair of adjacent lateral walls 131 and each pair of adjacent longitudinal walls 133. For illustrative purposes, a chamber 135 is formed between lateral walls 131a, 131b and longitudinal walls 133a, 133b. Chambers 135 of bottom plate 130 are thereby configured to receive a cooling medium within chambers 135. In the illustrated version, one or more channels 136 are formed through one or more select walls 131, 133 of bottom plate 130 that are configured to allow the cooling medium to flow through channels 136 between chambers 135. For instance, a pair of channels 136 is formed through each interior lateral wall 131b, 131c, 131d in each chamber 135. A pair of channels 136 are also formed through interior longitudinal walls 133b, 133d at an end portion of each interior longitudinal wall 133b, 133d. Still other suitable configurations for channels 136 will be apparent to one with ordinary skill in the art in view of the teachings herein for allowing the cooling medium to flow within cold plate 110.

Each chamber 135 comprises a plurality of ribs 135a, 135b extending outwardly from body 132 within chamber 135. As shown, a lateral rib 135a extends laterally within a central portion of chamber 135 and a longitudinal rib 135b extends longitudinally within a central portion of chamber 135, transverse relative to lateral rib 135a. Ribs 135a, 135b extend only within a portion of chamber 135 such that ribs 135a, 135b have a smaller thickness than walls 131, 133. Ribs 135a, 135b may provide additional support structure for bottom plate 130, although ribs 135a, 135b are optional.

Referring to FIGS. 12 and 16, bottom plate 130 further comprises a plurality of slats 141, 143 extending downwardly from bottom plate 130 that are configured to provide additional support to bottom plate 130. For instance, slats 141, 143 include a plurality of lateral slats 141 extending laterally along body 132 and a plurality of longitudinal slats 143 extending longitudinally along body 132. As shown in FIGS. 12 and 16, bottom plate 130 includes five lateral slats 141a, 141b, 141c, 141d, 141e and five longitudinal slats 143a, 143b, 143c, 143d, 143e that are each aligned with a respective lateral wall 131 and longitudinal wall 133 of bottom plate 130, though any other suitable number and/or configuration of slats 141, 143. Additionally or alternatively, slats 141, 143 can be provided on top plate 120. In some versions, bottom plate 130 can be manufactured as an integral component with chambers 135 and/or slats 141, 143 bored out from the integral component. In some other versions, body 132, walls 131, 133, ribs 135a, 135b and/or slats 141, 143 of bottom plate 130 can be provided as separate components that are assembled together to form bottom plate 130.

Figure 17:
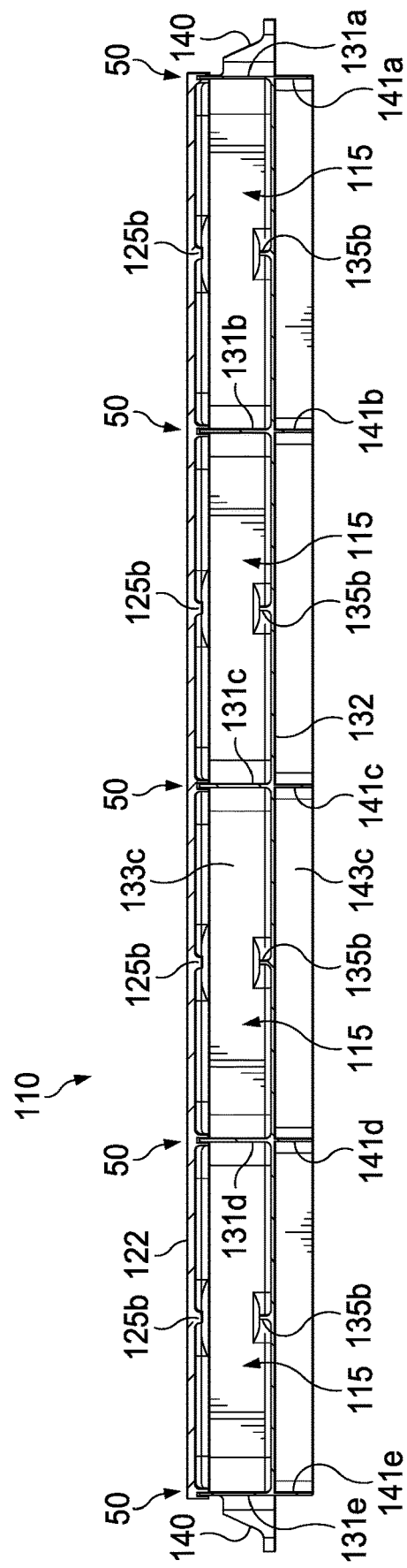
FIG. 17 is a cross-sectional view of the cold plate of FIG. 11 taken along line 17-17 of FIG. 11.

Referring to FIG. 17, top plate 120 is assembled with bottom plate 130 to align walls 121, 123 of top plate 120 with the respective walls 131, 133 of bottom plate 130 to form an interlocking joint 50 between each wall 121, 123 of top plate 120 and each wall 131, 133 of bottom plate 130 as discussed above. Interlocking joints 50 are thereby formed laterally along cold plate 110 between each lateral wall 121 of top plate 120 and each lateral wall 131 of bottom plate 130 and longitudinally along cold plate 110 between each longitudinal wall 123 of top plate 120 and each longitudinal wall 133 of bottom plate 130. Accordingly, walls 121, 123 of top plate 120 and walls 131, 133 of bottom plate 130 align chambers 125 of top plate 120 with chambers 135 of bottom plate 130 to form a plurality of compartments 115 within cold plate 110 for receiving the cooling medium therein. Top plate 120 can be bonded, such as with epoxy, friction stir welded, fasteners, etc., with bottom plate 130 at interlocking joints 50 to provide a fluid-tight seal between walls 121, 123 of top plate 120 and walls 131, 133 of bottom plate 130. Such interlocking joints 50 can be configured to provide the fluid-tight seal to inhibit the cooling medium from leaking from cold plate 110 to the component supported by cold plate 110 in a vibrational environment, such as during operation of an aircraft. In addition to providing localized cooling of a component, cold plate 110 is configured to support the weight of such component. Slats 141, 143 of cold plate 110 can provide additional support to cold plate 110 for supporting the component.

Figure 18:
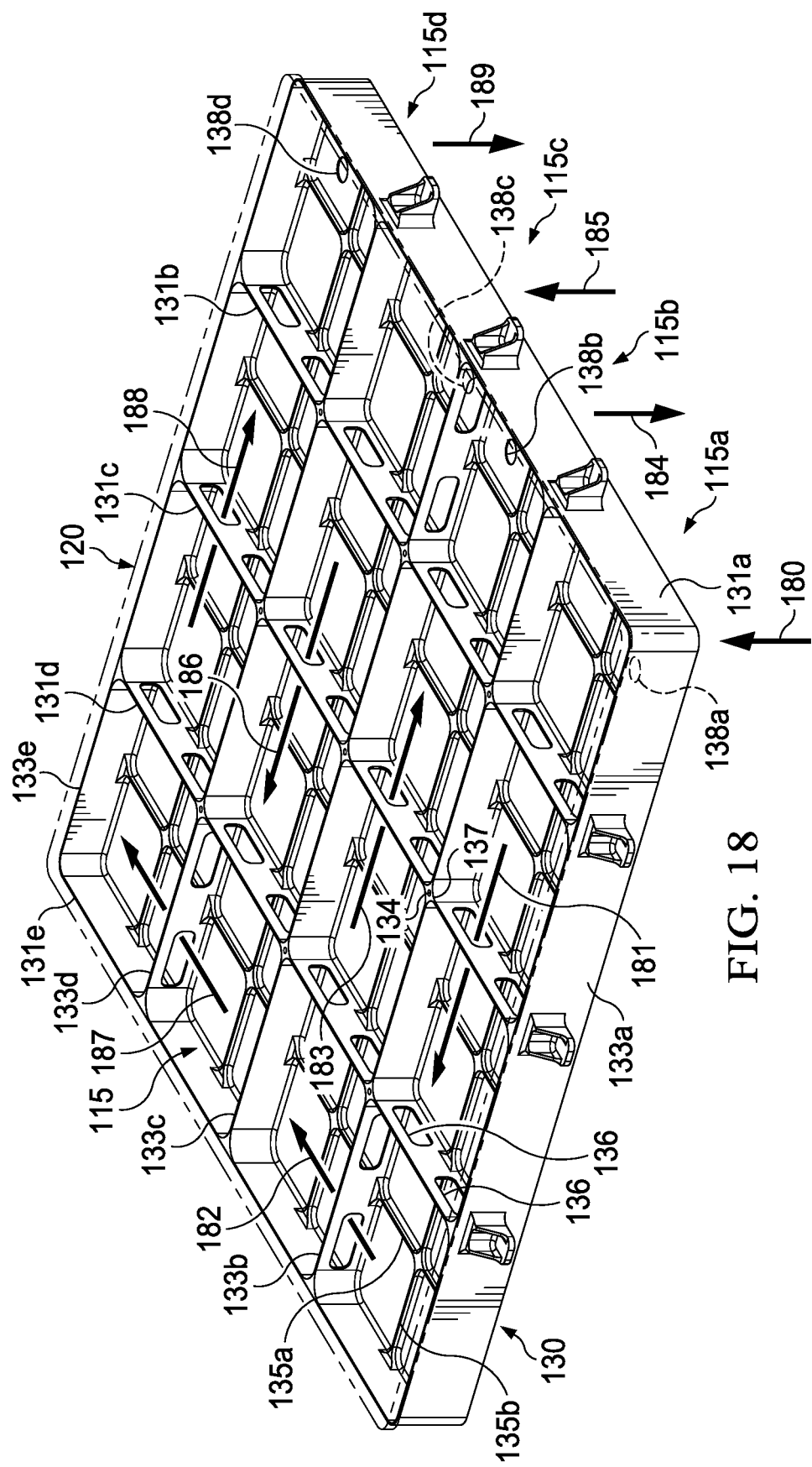
FIG. 18 is a top perspective view of the cold plate of FIG. 11 with the top plate shown as being transparent for illustrative purposes, showing a flow path of a cooling medium through the cold plate.

Referring to FIG. 18, an exemplary flow path of the cooling medium through compartments 115 of cold plate 110. In the illustrated version, the cooling medium can enter cold plate 110 through a first port 138a of cold plate 110 as shown by arrow 180. The cooling medium can then flow through channels 136 of the internal lateral walls 131b, 131c, 131d of bottom plate 130 through a first row of compartments 115a of cold plate 110 as shown by arrow 181. The cooling medium can then flow through channels 136 of longitudinal wall 133b, as shown by arrow 182, and through a second row of compartments 115b of cold plate 110 as shown by arrow 183. The cooling medium can then exit cold plate 110 through a second portion 138b in second row of compartments 115b as shown by arrow 184. The cooling medium can also enter cold plate 110 through a third port 138c as shown by arrow 185 and flow through channels 136 of the internal lateral walls 131b, 131c, 131d of bottom plate 130 through a third row of compartments 115c of cold plate 110 as shown by arrow 186. The cooling medium can flow through longitudinal wall 133d, as shown by arrow 87, and through a fourth row of compartments 115d of cold plate 110 as shown by arrow 188. The cooling medium can then exit cold plate 110 through a fourth port 138d of cold plate 110 as shown by arrow 189. Compartments 115 are thereby configured to direct the cooling medium through cold plate 110. The flow of the cooling medium through cold plate 110 can provide cooling to a battery 60 (see FIG. 9). Still other suitable configurations for cold plate 110 will be apparent to one with ordinary skill in the art in view of the teachings herein. For instance, cold plate 110 can have more or less compartments 115 to for directing the cooling medium through all or a portion of cold plate 110.

Figure 19:
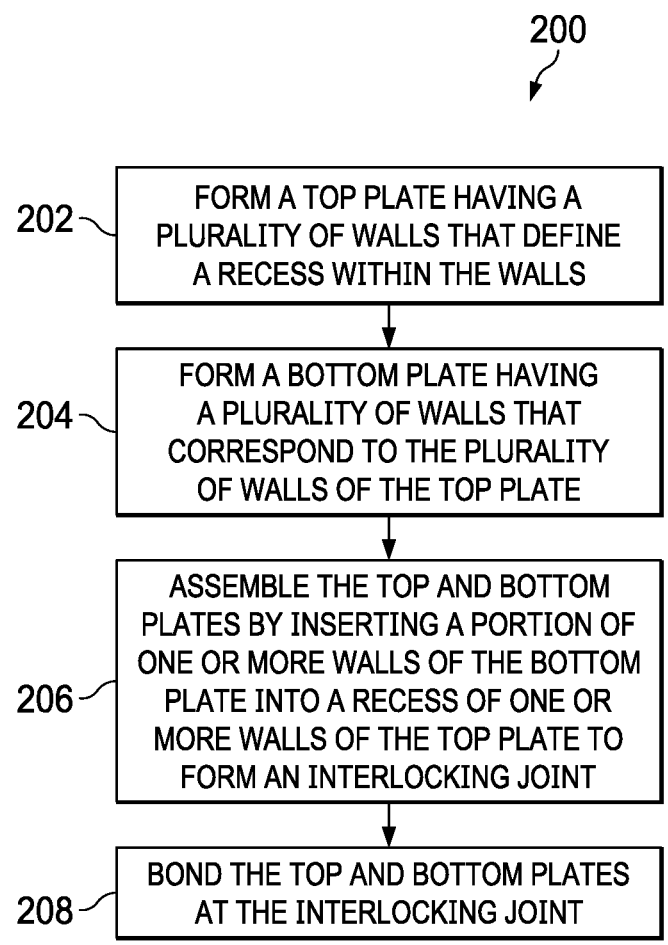
FIG. 19 is a schematic of an exemplary method of manufacturing a cold plate having interlocking joints.

III. An Exemplary Method of Manufacturing a Cold Plate Having Interlocking Joints Referring to FIG. 19, an exemplary method 200 is shown for manufacturing a cold plate 10, 110 having interlocking joints 50. Method 200 of the illustrated version comprises a step 202 of forming a top plate 20, 120 having a plurality of walls 21, 23, 121, 123 that define a recess 29, 129 within at least a portion of one or more walls 21, 23, 121, 123 of the plurality of walls 21, 23, 121, 123. In some versions, each wall 21, 23, 121, 123 includes a recess 29, 129 formed along an entire length of each wall 21, 23, 121, 123. In some other versions, a select one or more walls 21, 23, 121, 123 include a recess 29, 129 formed along at least a portion of walls 21, 23, 121, 123. Top plate 20, 120 can be formed from a thermally conductive material, such as aluminum, steel, copper, and/or any other suitable metal. Top plate 20, 120 can be manufactured as an integral component with walls 21, 23, 121, 123 and/or recesses 29, 129 bored out from the integral component. In some other versions, walls 21, 23, 121, 123 can be provided as separate components that are assembled together to form top plate 20, 120. Still other suitable methods for forming top plate 20, 120 will be apparent to one with ordinary skill in the art in view of the teachings herein. For instance, top plate 20, 120 can further include one or more ribs 25a, 25b, 125a, 125b and/or slats 141, 143 for providing additional support for top plate 20, 120, one or more openings 24, 124 for coupling top plate 20, 120 with another component, and/or one or more ports 26 for inputting and/or outputting a cooling medium within cold plate 10, 110.

Method 200 then comprises a step 204 of forming a bottom plate 30, 130 having a plurality of walls 31, 33, 131, 133 that correspond to the plurality of walls 21, 23, 121, 123 of top plate 20, 120. Bottom plate 30, 130 can be formed from a thermally conductive material, such as aluminum, steel, copper, and/or any other suitable metal. Bottom plate 30, 130 can be manufactured as an integral component with walls 31, 33, 131, 133 bored out from the integral component. In some other versions, walls 31, 33, 131, 133 can be provided as separate components that are assembled together to form bottom plate 30, 130. Still other suitable methods for forming bottom plate 30, 130 will be apparent to one with ordinary skill in the art in view of the teachings herein. For instance, bottom plate 30, 130 can further include one or more ribs 35a, 35b, 135a, 135b and/or slats 141, 143 for providing additional support for bottom plate 30, 130, one or more channels 36, 136 for allowing a cooling medium to flow through bottom plate 30, 130, one or more openings 34, 134 for coupling bottom plate 30, 130 with another component, and/or one or more ports 138 for inputting and/or outputting a cooling medium within cold plate 10, 110.

Method 200 then comprises a step 206 of assembling top plate 20, 120 with bottom plate 30, 130 by inserting a portion of one or more walls 31, 33, 131, 133 of bottom plate 30, 130 into a portion of recesses 29, 129 of one or more walls 21, 23, 121, 123 of top plate 20, 120 to form an interlocking joint 50. In some versions, a portion of each wall 31, 33, 131, 133 of bottom plate 30, 130 is inserted within a recess 29, 129 of each wall 21, 23, 121, 123 of top plate 20, 120 along an entire length of walls 31, 33, 131, 133. In some other versions, a portion of a select one or more walls 31, 33, 131, 133 is inserted within a recess 29, 129 of a select one or more walls 21, 23, 121, 123 of top plate 20, 120. Method 200 then comprises a step 208 of bonding top plate 20, 120 and bottom plate 30, 130 together at interlocking joints 50. Accordingly, the bonded interlocking joints 50 can maintain the position of top plate 20, 120 relative to bottom plate 30, 130 and/or provide a fluid-tight seal between top plate 20, 120 and bottom plate 30, 130 to inhibit the cooling medium from leaking from cold plate 10, 110. Top and bottom plates 20, 120, 30, 130 can be bonded, such as with epoxy, friction stir welded, fasteners, etc. Still other suitable methods for bonding plates 20, 120, 30, 130 will be apparent to one with ordinary skill in the art in view of the teachings herein.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A cold plate for providing cooling to a component, wherein the cold plate comprises:
   a top plate comprising a body and a first plurality of walls extending from a side of the body, wherein each wall of the first plurality of walls includes a recess extending within the wall, wherein an opening extends from the recess to a first flat surface of the body, wherein the side of the body opposes the first flat surface of the body; and
   a bottom plate comprising a body and a second plurality of walls extending from the body, wherein the second plurality of walls is thinner and taller than the first plurality of walls, wherein the opening is configured to couple the top plate with the bottom plate;
   wherein the top plate is coupled with the bottom plate such that an end portion of each wall of the second plurality of walls of the bottom plate is inserted within the recess of each wall of the first plurality of walls of the top plate to form an interlocking joint between each wall of the first plurality of walls of the top plate and each wall of the second plurality of walls of the bottom plate that is configured to restrict movement of the top plate and the bottom plate with respect to each other;
   wherein the cold plate is configured to receive a cooling medium between the top and bottom plates, wherein the cold plate is configured to transfer heat generated from the component to the cooling medium to provide cooling of the component.

2. The cold plate of claim 1, wherein the cold plate is coupled with the component to support the weight of the component so as to maintain the position of the component relative to the cold plate.

3. The cold plate of claim 1, wherein each wall of the plurality of walls of the top plate is bonded with each wall of the plurality of walls of the bottom plate at each interlocking joint such that each interlocking joint is sealed to inhibit the cooling medium from leaking through the interlocking joint.

4. The cold plate of claim 1, wherein the a select one or both of the body of the top plate and the body of the bottom plate include one or more inlet ports for allowing the cooling medium to enter the cold plate through the one or more inlet ports, a select one or both of the body of the top plate and the body of the bottom plate include one or more outlet ports for allowing the cooling medium to exit the cold plate through the one or more inlet ports.

5. The cold plate of claim 1, wherein a select one or more interior walls of the plurality of walls of the bottom plate include one or more channels for allowing the cooling medium to flow through the channels.

6. The cold plate of claim 1, wherein the first plurality of walls of the top plate include first one or more lateral walls extending laterally along the body of the top plate and first one or more longitudinal walls extending longitudinally along the body of the top plate transversely relative to the first one or more lateral walls, wherein the second plurality of walls of the bottom plate include second one or more lateral walls extending laterally along the body of the bottom plate and second one or more longitudinal walls extending longitudinally along the body of the bottom plate transversely relative to the second one or more lateral walls.

7. The cold plate of claim 6, wherein one or more lateral walls and the one or more longitudinal walls of the top plate intersect to form one or more intersection points, wherein the opening extends through the intersection point.

8. The cold plate of claim 6, wherein the first one or more lateral walls and the second one or more lateral walls are perpendicular to the first one or more longitudinal walls and the second one or more longitudinal walls.

9. The cold plate of claim 1, wherein a select one or both of the top plate and the bottom plate includes one or more ribs extending between the plurality of walls of the select one or both of the top plate and the bottom plate.

10. The cold plate of claim 1, wherein the plurality of walls of the top plate form one or more first chambers between the plurality of walls of the top plate, wherein the plurality of walls of the bottom plate form one or more second chambers between the plurality of walls of the bottom plate, wherein the top plate is coupled with the bottom plate to align the one or more first chambers with the one or more second chambers to form one or more compartments configured to direct a flow of the cooling medium through the one or more compartments.

11. The cold plate of claim 1, wherein the cold plate comprises one or more slats extending outwardly from a select one or both of the body of the top plate and the body of the bottom plate.

12. The cold plate of claim 1, wherein the cold plate is coupled with a battery for providing cooling to the battery.

13. The cold plate of claim 1, wherein the cold plate is coupled with a pump and a heat exchanger, wherein the pump is configured to pump the cooling medium through the cold plate and the heat exchanger.

14. The cold plate of claim 1, wherein the first flat surface is configured to be coupled to a flat face of one or more batteries and the bottom plate comprises a second flat surface configured to be coupled to a flat floor of a vehicle.

15. The cold plate of claim 1, wherein the cold plate is coupled with the component on an aircraft.

16. The cold plate of claim 1, wherein the cold plate is coupled with a pump configured to pump the cooling medium through the cold plate.

17. The cold plate of claim 1, wherein the cold plate is coupled with a heat exchanger configured to dissipate heat from the cooling medium.

18. A cold plate comprising:
a top plate comprising a body and a first plurality of walls extending from the body, wherein each wall of the first plurality of walls includes a recess extending within the wall, wherein an opening extends from the recess to a first flat surface of the body, wherein the side of the body opposes the first flat surface of the body; and
a bottom plate comprising a body and a second plurality of walls extending from the body, wherein the second plurality of walls is thinner and taller than the first plurality of walls, wherein the second plurality of walls includes a plurality of channels configured to allow a cooling medium to flow through the second plurality of walls, wherein the opening is configured to couple the top plate with the bottom plate;
wherein the top plate is coupled with the bottom plate such that an end portion of each wall of the second plurality of walls of the bottom plate is inserted within the recess of each wall of the first plurality of walls of the top plate to form an interlocking joint between each wall of the first plurality of walls of the top plate and each wall of the second plurality of walls of the bottom plate that is configured to restrict movement of the top plate and the bottom plate with respect to each other;
wherein the cold plate is configured to receive the cooling medium between the top and bottom plates,
wherein the cold plate is coupled with a component to support the weight of the component and to transfer heat generated from the component to the cooling medium to provide cooling of the component.

19. A cooling system for providing cooling to a component, wherein the cooling system comprises:
a pump;
a heat exchanger;
a cold plate comprising: a top plate comprising a body and a first plurality of walls extending from the body, wherein each wall of the first plurality of walls includes a recess extending within the wall, wherein an opening extends from the recess to a first flat surface of the body, wherein the side of the body opposes the first flat surface of the body, and
a bottom plate coupled with the top plate to receive a cooling medium between the bottom plate and top plate, wherein the bottom plate comprises a body and a second plurality of walls extending from the body, wherein the second plurality of walls is thinner and taller than the first plurality of walls, wherein the opening is configured to couple the top plate with the bottom plate,
wherein the top plate is coupled with the bottom plate such that an end portion of each wall of the second plurality of walls of the bottom plate is inserted within the recess of each wall of the first plurality of walls of the top plate to form an interlocking joint between each wall of the first plurality of walls of the top plate and each wall of the second plurality of walls of the bottom plate that is configured to restrict movement of the top plate and the bottom plate with respect to each other; and
a component coupled with the cold plate, wherein the component is configured to generate heat during operation of the component;
wherein the pump is configured to pump the cooling medium through the cold plate and the heat exchanger;
wherein the cold plate is configured to transfer heat generated from the component to the cooling medium to provide cooling of the component,
wherein the first plurality of walls and the second plurality of walls collectively define a plurality of chambers, wherein the pump is further configured to pump the cooling medium through multiple contiguous chambers of the plurality of chambers, wherein greater than two chambers contact the interlocking joint.

20. The cooling system of claim 19, wherein the component is a battery.

\* \* \* \* \*